United States Patent
Hashimoto et al.

(10) Patent No.: US 10,190,302 B2
(45) Date of Patent: Jan. 29, 2019

(54) SANITARY CLEANSING DEVICE

(71) Applicant: TOTO LTD., Kitakyushu-shi, Fukuoka (JP)

(72) Inventors: Hiroshi Hashimoto, Kitakyushu (JP); Junki Hamada, Kitakyushu (JP); Keisuke Fujita, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 26 days.

(21) Appl. No.: 15/469,091

(22) Filed: Mar. 24, 2017

(65) Prior Publication Data

US 2017/0275866 A1   Sep. 28, 2017

(30) Foreign Application Priority Data

Mar. 28, 2016   (JP) .................... 2016-063362

(51) Int. Cl.
| | |
|---|---|
| *E03D 9/08* | (2006.01) |
| *B05B 1/08* | (2006.01) |
| *B05B 1/34* | (2006.01) |
| *B05B 9/00* | (2006.01) |
| *G01G 19/52* | (2006.01) |

(52) U.S. Cl.
CPC .......... *E03D 9/08* (2013.01); *B05B 1/08* (2013.01); *B05B 1/3489* (2013.01); *B05B 9/002* (2013.01); *G01G 19/52* (2013.01)

(58) Field of Classification Search
CPC ................... A47K 7/08; E03D 9/08
USPC ............... 4/420.1–420.5, 443–448
See application file for complete search history.

(56) References Cited

U.S. PATENT DOCUMENTS

| | | | | |
|---|---|---|---|---|
| 4,570,274 A | * | 2/1986 | Kaneko ............... | E03D 9/08 4/443 |
| 5,196,189 A | | 3/1993 | Jacquet et al. | |
| 5,826,282 A | * | 10/1998 | Matsumoto .......... | E03D 9/08 239/543 |
| 8,495,770 B2 | * | 7/2013 | Koga ................ | B05B 15/70 4/420.4 |
| 2009/0313752 A1 | * | 12/2009 | Kunimoto ........... | A47K 10/48 4/662 |

(Continued)

FOREIGN PATENT DOCUMENTS

| | | |
|---|---|---|
| JP | S61-53929 A | 3/1986 |
| JP | H02-197632 A | 8/1990 |
| JP | 2006-249671 A1 | 9/2006 |

*Primary Examiner* — David Angwin
*Assistant Examiner* — Nicholas Ros
(74) *Attorney, Agent, or Firm* — Baker & Hostetler LLP

(57) ABSTRACT

Provided is a sanitary cleansing device configured so that user's defecation can be promoted with a comfortable feeling by spraying of cleansing water. The present invention provides a sanitary cleansing device (1) including a nozzle assembly (6) provided with a spray port, a nozzle drive device (12), an operation device (10) operated by a user, and a spray control device (20) configured to actuate the nozzle drive device to execute a massage cleansing mode. The massage cleansing mode is a cleansing mode for repeating a predetermined massage cleansing cycle including a turning movement pattern for turning a water splash point of the cleansing water sprayed from the spray port at the periphery of a private area position of a seated human body and a front-to-back movement pattern for moving the water splash point through the private area position in a substantially front-to-back direction of the human body.

11 Claims, 21 Drawing Sheets

(56) References Cited

U.S. PATENT DOCUMENTS

2017/0275867 A1* 9/2017 Hashimoto ............... E03D 9/08

* cited by examiner

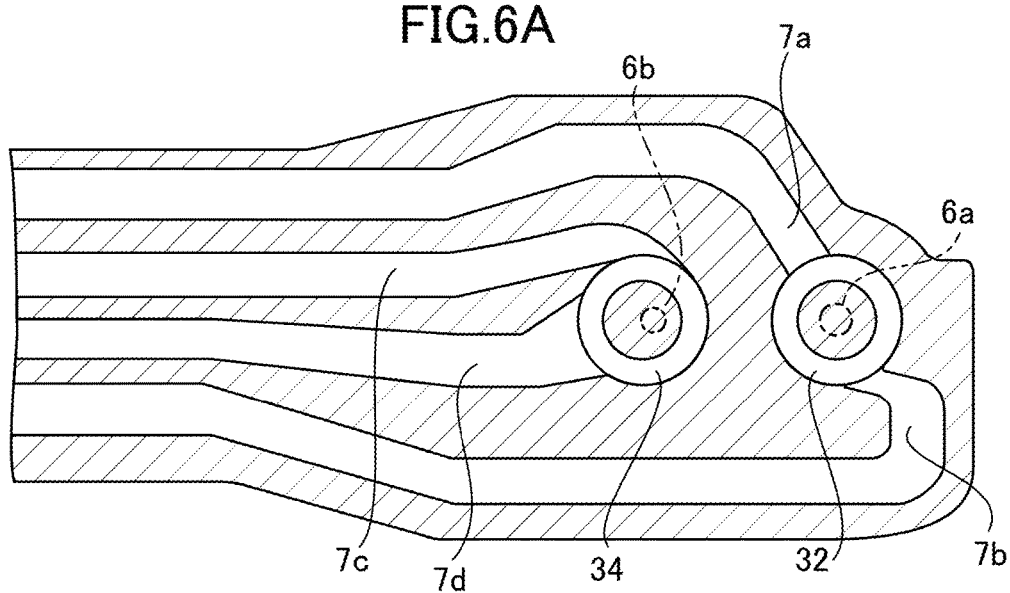
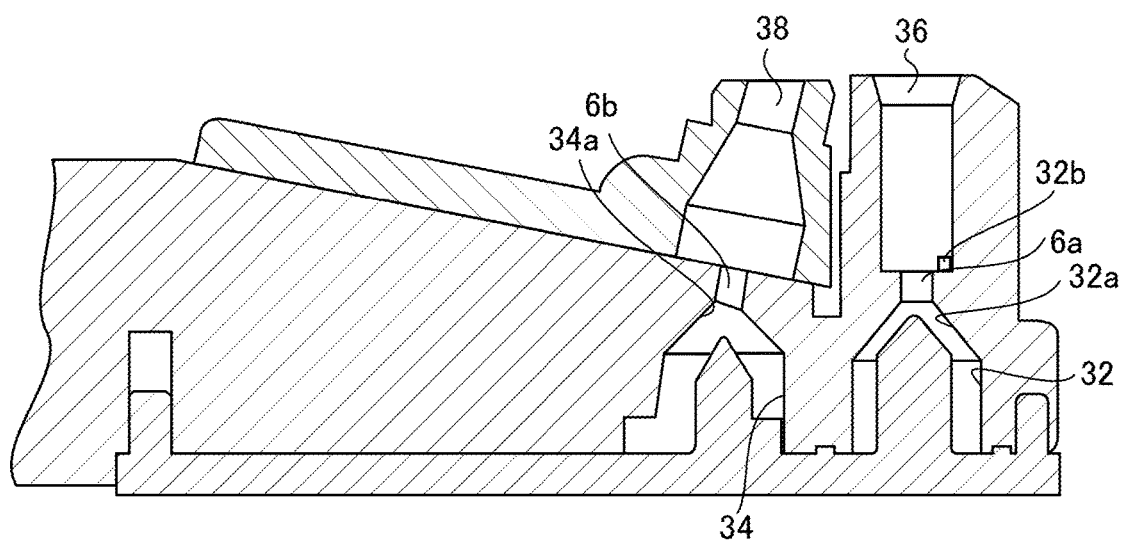

RIGHT LEG — LEFT LEG
FRONT-TO-BACK MOVEMENT

RIGHT LEG — LEFT LEG
WIDE SWING

BACK

RIGHT LEG     LEFT LEG
SPOT CLEANSING

BACK

RIGHT LEG     LEFT LEG
REFRESHING SPOT
CLEANSING

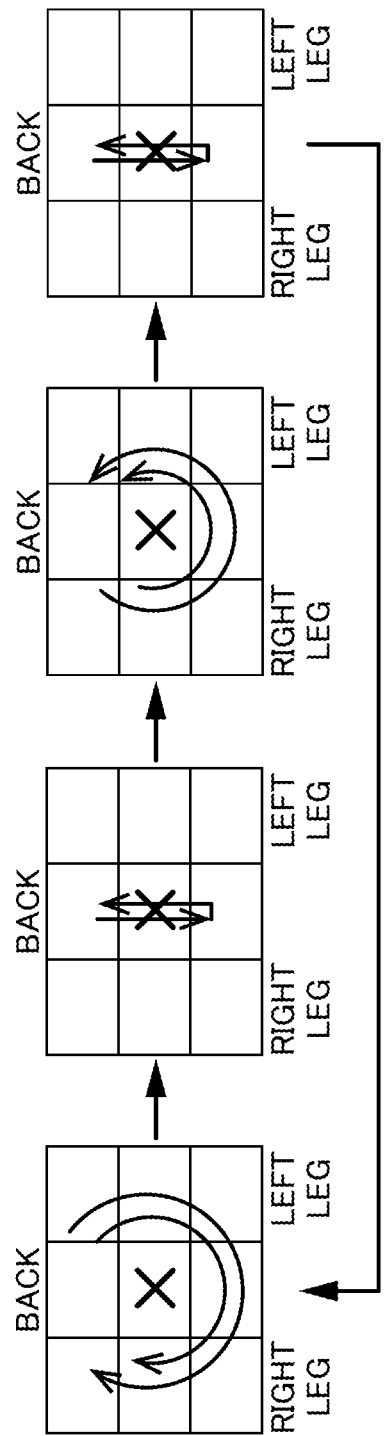

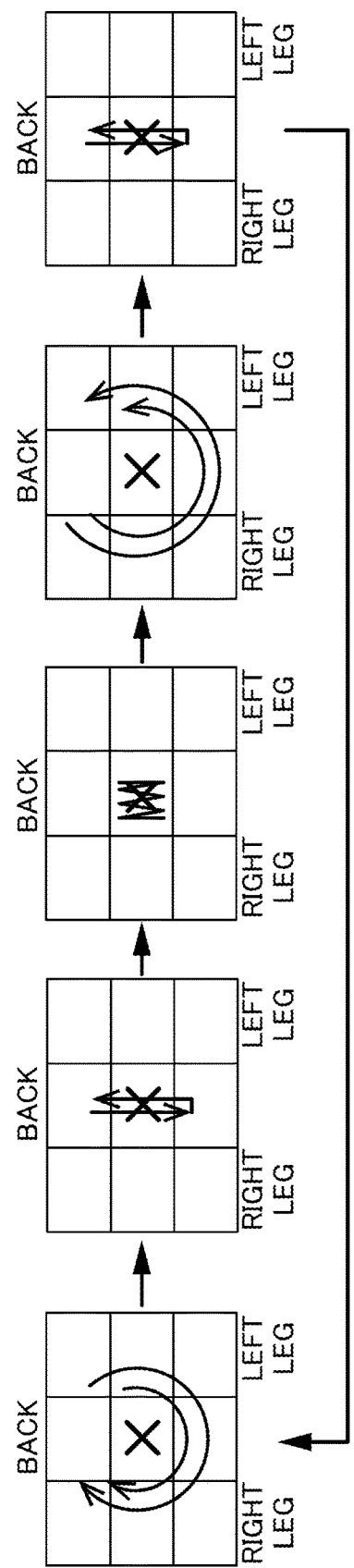

SANITARY CLEANSING DEVICE

BACKGROUND OF THE INVENTION

Field of the Invention

The present invention relates to a sanitary cleansing device, and particularly relates to a sanitary cleansing device configured to spray cleansing water to a private area of a human body seated on a toilet seat to cleanse the private area.

Description of the Related Art

Japanese Patent Laid-Open No. 61-053929 (Patent Literature 1) and Japanese Patent Laid-Open No. 02-197632 (Patent Literature 2) each describe a sanitary cleansing device. In these sanitary cleansing devices, a spray port of a nozzle configured to spray cleansing water is configured to move not only in a front-to-back direction (a direction connecting between front and back surfaces of a user seated on a toilet seat) but also in a right-to-left direction (a direction connecting between the right and left legs of the user seated on the toilet seat). With this configuration, movement of a water splash point of sprayed cleansing water on a human body can be expanded not only in the front-to-back direction but also in the right-to-left direction, and therefore, a wider area in the vicinity of a private area of the human body can be cleansed.

On the other hand, Japanese Patent No. 5196189 (Patent Literature 3) describes a water discharging device. In this water discharging device, water masses are formed by pulsation of discharged cleansing water, and therefore, a discharged water cross-sectional area is expanded. These water masses continuously come into contact with a cleansing target object so that a strong cleansing force can be successfully provided with a small amount of cleansing water.

Note that in the present specification, the "water mass" merely means a "volume of water," and the phrasing of splashing water masses does not mean a state in which cleansing water sprayed from a water discharge port (a spray port) continuously contacts in a linear shape, but a state in which drops or particles of cleansing water intermittently contact.

SUMMARY OF THE INVENTION

In recent years, saving of cleansing water used in a restroom has been strongly demanded. Such water saving has been strongly demanded not only for cleansing water used for cleansing of a water closet but also for cleansing water used in a sanitary cleansing device. For the purpose of such water saving, various designs as described above have been made for the sanitary cleansing device.

On the other hand, in addition to the function of cleaning a dirty private area due to defecation etc., it has been demanded for the sanitary cleansing device that a feeling of satisfaction such as a secure feeling and a comfortable feeling is provided to a user after cleansing.

For example, as a result of study by the inventor of the present invention, it has been found that many users use the sanitary cleansing device not only for private area cleansing but also for defecation promotion. However, it is difficult to provide a defecation promotion effect with a comfortable feeling by cleansing water spraying similar to normal private area cleansing.

Thus, the present invention is intended to provide a sanitary cleansing device configured so that user's defecation can be promoted with a comfortable feeling by spraying of cleansing water.

For solving the above-described problems, the present invention provides a sanitary cleansing device for spraying cleansing water to a private area of a human body seated on a toilet seat to cleanse the private area. The sanitary cleansing device includes a nozzle assembly provided with a spray port through which the cleansing water is sprayed obliquely upward from a back side to a front side of the seated human body, a nozzle drive device configured to drive the nozzle assembly such that a water splash point of the cleansing water sprayed from the spray port moves on the human body in at least two directions including a front-to-back direction and a right-to-left direction, an operation device operated by a user to start spraying of the cleansing water from the spray port, and a spray control device configured to actuate, based on operation of the operation device, the nozzle drive device to execute a massage cleansing mode. The massage cleansing mode is a cleansing mode for repeating a predetermined massage cleansing cycle including a turning movement pattern for turning the water splash point of the cleansing water sprayed from the spray port at the periphery of a private area position of the seated human body and a front-to-back movement pattern for moving the water splash point through the private area position in the substantially front-to-back direction of the human body.

When cleansing water is sprayed toward the private area of the human body, the user might have an urge to defecate due to a backflow of the cleansing water from the anus to the rectum. Using such a phenomenon, the sanitary cleansing device is sometimes utilized for defecation promotion. However, some users dislike such a backflow of cleansing water, and a different defecation promotion technique needs to be provided for such users. In recent years, for more water saving in the sanitary cleansing device, cleansing water sprayed from the spray port tends to be sprayed thin at a high flow velocity. For the users disliking a backflow of cleansing water, it is difficult to use the sanitary cleansing device for defecation promotion. According to the present invention configured as described above, the massage cleansing mode is provided, which is for repeating the predetermined massage cleansing cycle including the turning movement pattern for turning the water splash point of sprayed cleansing water at the periphery of the private area position of the seated human body and the front-to-back movement pattern for moving the water splash point through the private area position in the substantially front-to-back direction of the human body. Thus, a defecation promotion effect can be, with a comfortable feeling, provided also to the users disliking a backflow of cleansing water. That is, since the massage cleansing cycle includes the turning movement pattern for turning the water splash point at the periphery of the private area position, the anal sphincter of the user can be substantially massaged without a backflow of cleansing water, leading to defecation promotion with a comfortable feeling.

However, the present inventor has found another problem that a sufficient comfortable feeling cannot be provided only by the turning movement pattern. That is, there is the following problem: direct water splash on the private area is not performed only by the turning movement pattern, and therefore, a stimulus to the private area is small; and for this reason, a sufficient feeling of cleansing cannot be provided to the user, and a feeling of satisfaction cannot be provided. For this reason, in the present invention, the massage cleansing cycle is configured such that the turning movement pattern is combined with the front-to-back movement pattern for moving the water splash point through the private area position in the substantially front-to-back direction of the human body, and as a result, both of defecation promotion by comfortable massage of the anal sphincter and a feeling of cleansing can be successfully realized. Note that the massage cleansing mode is suitable not only for use for defecation promotion before defecation, but also for use for massage after defecation.

In the present invention, the turning movement pattern preferably includes a clockwise turning movement pattern and a counterclockwise turning movement pattern.

A phenomenon has been known, which is called "acclimatization" that when the same level of stimulus is continuously provided to a human body, the human body becomes acclimated to such a stimulus, and therefore, less feels the stimulus. According to the present invention configured as described above, the turning movement pattern includes the clockwise turning movement pattern and the counterclockwise turning movement pattern. Thus, acclimatization is less caused even when the massage cleansing mode is continuously executed for a long period of time, and a sufficient defecation promotion effect can be provided by a long period of use.

In the present invention, in the massage cleansing cycle, the period for performing the turning movement pattern is preferably longer than the period for performing the front-to-back movement pattern.

According to the present invention configured as described above, the period for performing the turning movement pattern is longer than the period for performing the front-to-back movement pattern. Thus, the turning movement pattern with a high degree of demand for defecation promotion can be frequently executed, and therefore, a strong defecation promotion effect can be provided while a feeling of cleansing is provided to the user.

In the present invention, the front-to-back movement pattern included in the massage cleansing cycle is preferably constantly an identical movement pattern.

As a result of study by the present inventor, it has been found that execution of the front-to-back movement pattern acts in the direction of diminishing the effect of massage of the anal sphincter. According to the present invention configured as described above, the front-to-back movement pattern included in the massage cleansing cycle is constantly the identical movement pattern. Thus, the user becomes acclimated to the stimulus of the front-to-back movement pattern, and therefore, the action of diminishing the massage effect can be reduced to the minimum while a feeling of cleansing is provided to the user.

In the present invention, the front-to-back movement pattern is preferably a single cycle of straight reciprocation for moving the water splash point from the front side to the back side of the human body after movement of the water splash point from the back side to the front side of the human body.

When the water splash point reciprocates once from the back side to the front side of the human body and from the front side to the back side of the human body, the time for forming a water screen in the vicinity of the private area can be longer than that when the water splash point reciprocates in a reverse order. According to the present invention configured as described above, the front-to-back movement pattern is a single cycle of straight reciprocation for moving the water splash point from the front side to the back side of the human body after movement of the water splash point from the back side to the front side of the human body. Thus, the water screen can be effectively generated in the vicinity of the private area, and a sufficient feeling of cleansing can be provided to the user even with a small amount of cleansing water.

In the present invention, in a single massage cleansing cycle, the amount of the cleansing water sprayed during the turning movement pattern is preferably greater than the amount of the cleansing water sprayed during the front-to-back movement pattern.

As described above, the massage effect in the massage cleansing mode is mainly provided by the turning movement pattern. However, it has been found that without execution of the front-to-back movement pattern through the private area position, no water is directly splashed on the private area, and therefore, a feeling of discomfort and a feeling of incompleteness are provided to the user. According to the present invention configured as described above, the amount of cleansing water sprayed during the turning movement pattern is greater than the amount of the cleansing water sprayed during the front-to-back movement pattern. Thus, the amount of cleansing water can be reduced without a user's feeling of discomfort and incompleteness while a sufficient massage effect can be provided.

In the present invention, the massage cleansing cycle preferably further includes a vibration spot movement pattern for reciprocating the water splash point in the front-to-back direction of the human body in a stroke shorter than that of the front-to-back movement pattern.

In the vibration spot movement pattern for reciprocating the water splash point in the front-to-back direction of the human body in the short stroke, a stimulus to the private area can be maintained while a backflow of cleansing water can be reduced. According to the present invention configured as described above, the massage cleansing cycle includes the vibration spot movement pattern. Thus, both of the massage effect by a direct stimulus to the private area and a feeling of cleansing of the private area can be simultaneously enhanced.

In the present invention, the vibration spot movement pattern is preferably a movement pattern for reciprocating the water splash point in the front-to-back direction of the human body in the stroke shorter than that of the front-to-back movement pattern while laterally moving the water splash point in the right-to-left direction.

According to the present invention configured as described above, the vibration spot movement pattern is a movement pattern for reciprocating the water splash point in the front-to-back direction while laterally moving the water splash point in the right-to-left direction. Thus, a high effect of more reducing a backflow as compared to the movement pattern only in the front-to-back direction can be provided, and the massage effect and the cleansing feeling can be enhanced while a backflow can be more greatly reduced.

In the present invention, in the massage cleansing cycle, the turning movement pattern, the front-to-back movement pattern, the vibration spot movement pattern, and the turning movement pattern are preferably executed in this order.

According to the present invention configured as described above, the turning movement pattern, the front-to-back movement pattern, the vibration spot movement pattern, and the turning movement pattern are executed in this order. Thus, balance among an anal sphincter massage, a direct stimulus to the private area, and a cleansing feeling to the user is favorable, leading to a high defecation promotion effect and a high feeling of satisfaction.

In the present invention, the sanitary cleansing device preferably further includes a flow velocity changing device configured to change the flow velocity of the cleansing water sprayed from the spray port. The spray control device preferably actuates the flow velocity changing device such that the flow velocity of the cleansing water sprayed during the front-to-back movement pattern is lower than the flow velocity of the cleansing water sprayed during the turning movement pattern.

According to the present invention configured as described above, the flow velocity of cleansing water sprayed during the front-to-back movement pattern is lower than the flow velocity of cleansing water sprayed during the turning movement pattern. Thus, a backflow of cleansing water in the front-to-back movement pattern for directly splashing water on the private area position can be further reduced. Moreover, the human body is less sensitive at the periphery of the private area than at the private area. Thus, even when the front-to-back movement pattern is executed at a lower flow velocity after execution of the turning movement pattern, a feeling of discomfort can be less felt by the user. Further, since the front-to-back movement pattern is executed at a lower flow velocity, lowering of comfortability in a massage due to a strong stimulus to the sensitive private area can be prevented.

In the present invention, the operation device preferably includes a first operation section configured to execute the massage cleansing mode, and a second operation section configured to execute a fixed spot cleansing mode for stopping the spray port at a position at which the cleansing water is splashed on the private area position of the human body.

According to the present invention configured as described above, the first operation section configured to execute the massage cleansing mode and the second operation section configured to execute the fixed spot cleansing mode are provided. Thus, the user can clearly distinctively use the fixed spot cleansing mode for mainly cleansing the private area and the massage cleansing mode for mainly promoting defecation. Moreover, the fixed spot cleansing mode can smoothly transit to the massage cleansing mode.

In the present invention, the front-to-back movement pattern is preferably a figure-8-shaped movement pattern for executing, in this order, one-direction front-to-back movement through the private area position, turning movement halfway around the private area position, one-direction front-to-back movement through the private area position, and turning movement halfway around the private area position in a direction opposite to the turning movement.

According to the present invention configured as described above, the front-to-back movement pattern can be executed as the figure-8-shaped movement pattern. Thus, the interval of interrupting the movement pattern for turning the water splash position at the periphery of the private area position is further shortened, and the massage effect can be more improved.

According to the sanitary cleansing device of the present invention, user's defecation can be promoted with a comfortable feeling by spraying of cleansing water.

BRIEF DESCRIPTION OF THE DRAWINGS

FIG. 6A is an enlarged plan cross-sectional view of a tip end portion of a nozzle assembly driven by the nozzle drive device;

FIG. 6B is an enlarged side cross-sectional view of the tip end portion of the nozzle assembly;

FIG. 20 is a view for describing a massage cleansing cycle executed by operation of a massage button;

FIG. 21A is a view for describing the massage cleansing cycle executed by operation of the massage button;

DETAILED DESCRIPTION OF THE PREFERRED EMBODIMENT

Next, a preferred embodiment of the present invention will be described with reference to attached drawings.

Figure 1:
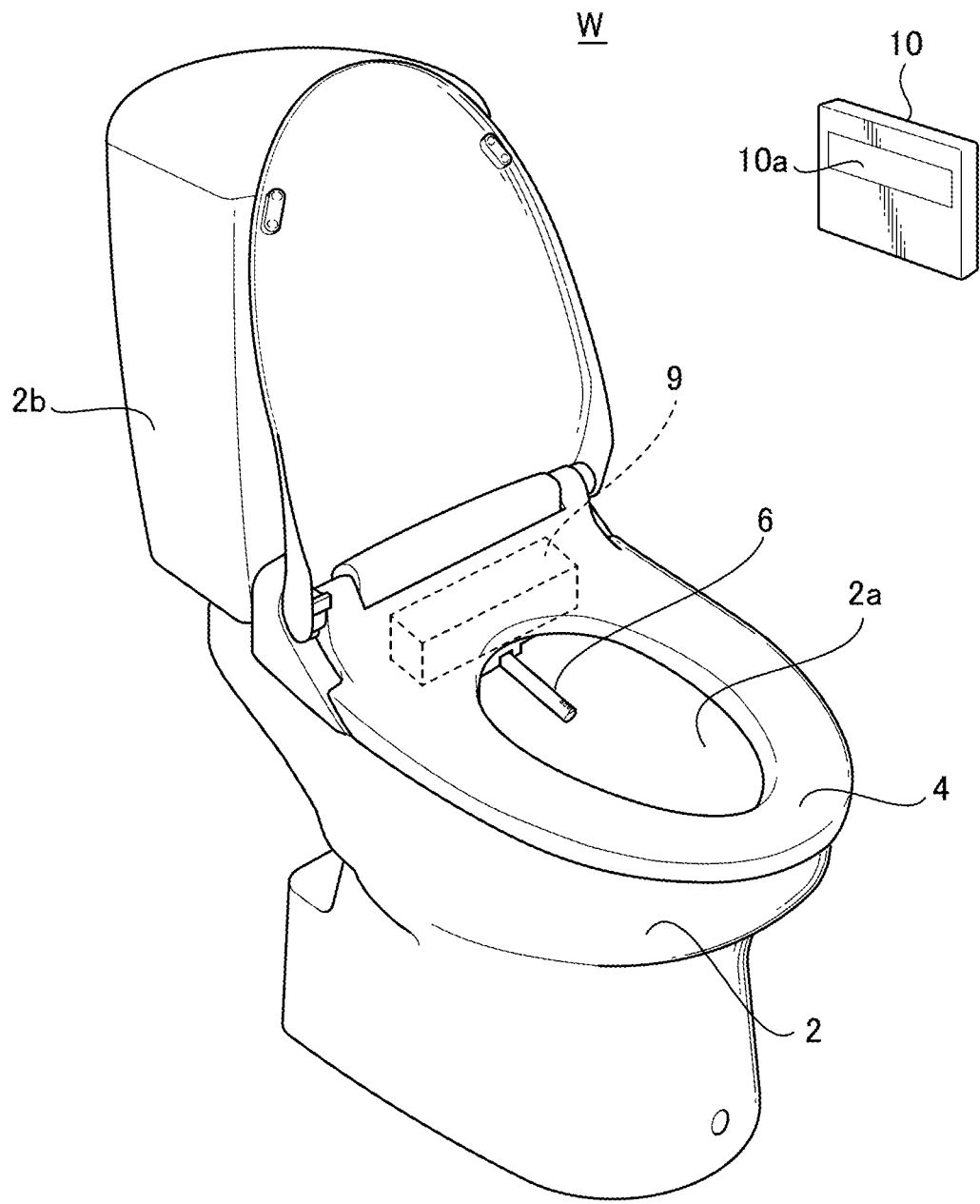
FIG. 1 is a perspective view of an entire water closet in which a sanitary cleansing device of an embodiment of the present invention is placed.
Figure 2:
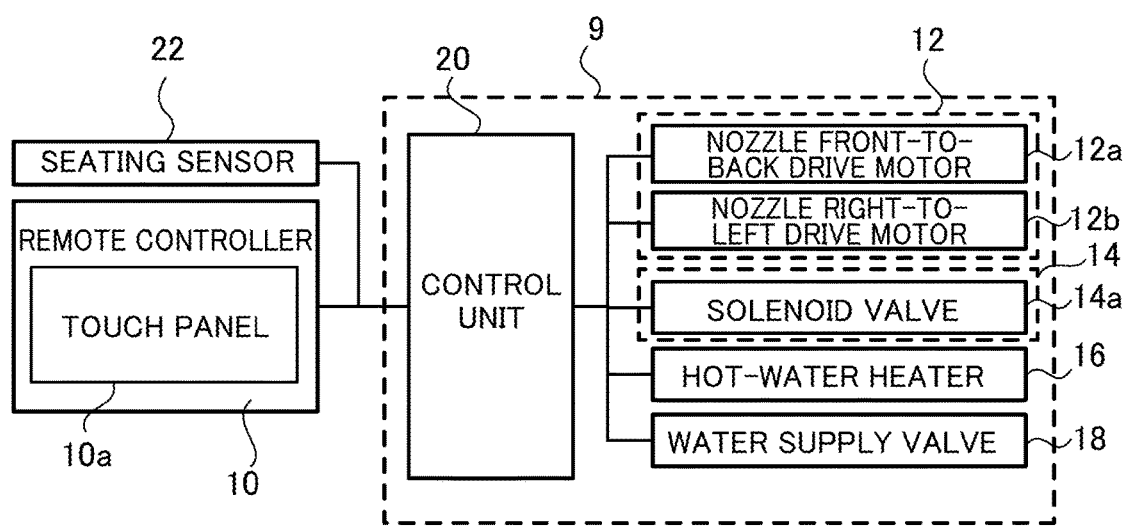
FIG. 2 is a block diagram of an entire configuration of the sanitary cleansing device of the embodiment of the present invention.

FIG. 1 is a perspective view of an entire water closet in which a sanitary cleansing device of the embodiment of the present invention is placed. FIG. 2 is a block diagram of an entire configuration of the sanitary cleansing device.

As illustrated in FIG. 1, a sanitary cleansing device 1 of the embodiment of the present invention is housed on a far side (a back side of a user seated on a toilet seat 4) of the toilet seat 4 disposed at an upper portion of a water closet body 2. A cleansing water tank 2b configured to store cleansing water for cleansing a bowl portion 2a of the water closet body 2 is provided at the far-side upper portion of the water closet body 2. Note that in the present embodiment, the sanitary cleansing device 1 is placed at the tank type water closet body 2 including the cleansing water tank 2b, but can be placed at a tap water direct pressure type water closet.

The sanitary cleansing device 1 further includes a nozzle assembly 6, and the nozzle assembly 6 can advance from the far side of the toilet seat 4 to below a private area of the seated user. The private area can be cleansed in such a manner that a spray port provided at a tip end portion of the advanced nozzle assembly 6 sprays cleansing water toward the private area of the user. A functional section 9 including a mechanism configured to drive the nozzle assembly 6 and a mechanism configured to supply the nozzle assembly 6 with cleansing water for cleansing the private area is housed on the far side of the toilet seat 4. Further, a remote controller 10 as an operation device is placed on a wall surface W of a restroom in which the water closet body 2 is placed. The user operates the remote controller to transmit a control signal to the functional section 9, thereby cleansing the bowl portion 2a or cleansing the private area in various cleansing modes. Note that in the present embodiment, various functions of the sanitary cleansing device 1 can be used by operation of a touch panel 10a of the remote controller 10 attached to the wall surface W, but the operation device of the sanitary cleansing device 1 can be provided at, e.g., a side portion of the toilet seat 4.

Next, a configuration of the functional section 9 provided at the sanitary cleansing device 1 will be described with reference to FIG. 2.

As illustrated in FIG. 2, the functional section 9 includes a nozzle drive device 12 configured to drive the nozzle assembly 6, a water mass generation device 14 configured to generate water masses of cleansing water sprayed from the spray port, a hot-water heater 16 as a heating device configured to heat cleansing water for cleansing the private area to a predetermined temperature, a water supply valve 18 configured to spray cleansing water or stop spraying of cleansing water, and a control unit 20 as a spray control device configured to actuate these devices to execute various types of cleansing.

Further, a detection signal from a seating sensor 22 as a seating state detection sensor built in the toilet seat 4 and the control signal transmitted from the remote controller 10 are input to the control unit 20.

The nozzle drive device 12 is a drive device configured to advance, based on a control signal from the control unit 20, the nozzle assembly 6 to below the private area of the user and retract the nozzle assembly 6 after cleansing of the private area. When cleansing water is sprayed from the spray port with the nozzle assembly 6 being advanced, the cleansing water is sprayed obliquely upward from a back side to a front side of a human body seated on the toilet seat 4, thereby cleansing the private area. Moreover, the nozzle drive device 12 includes a nozzle front-to-back drive motor 12a and a nozzle right-to-left drive motor 12b. Based on the control signal from the control unit 20, the nozzle drive device 12 actuates these motors so that a water splash point of cleansing water sprayed from the spray port can move on the human body in two directions (a front-to-back direction and a right-to-left direction). A specific configuration of the nozzle drive device 12 will be described later.

The water mass generation device 14 is configured to generate water masses of cleansing water sprayed from the spray port by pulsation of the flow velocity of the cleansing water and continuously splash the water masses on the human body at predetermined time intervals. The water mass generation device 14 includes a solenoid valve 14a. The water mass generation device 14 is configured to actuate the solenoid valve 14a based on the control signal from the control unit 20, thereby generating various sizes of water masses at various time intervals. A specific configuration of the water mass generation device 14 will be described later.

The hot-water heater 16 is an electric heater heated by power distribution. The hot-water heater 16 is a heating device energized based on the control signal from the control unit 20 upon spraying of cleansing water and using an instantaneous heat exchanger configured to spray supplied tap water while heating the tap water. Note that a storage type hot-water heater configured to store heated cleansing water can be employed for the present invention.

The water supply valve 18 is an electromagnetic valve configured such that opening/closing of the water supply valve 18 and the degree of opening of the water supply valve 18 are changed based on the control signal from the control unit 20. The water supply valve 18 is configured to switch between spraying of cleansing water supplied from a tap water line and stopping of spraying of the cleansing water and to change the power (the flow velocity) of cleansing water sprayed from the spray port.

The control unit 20 is configured to receive the control signal transmitted from the remote controller 10 to actuate, based on the control signal, the nozzle drive device 12, the water mass generation device 14, the hot-water heater 16, the water supply valve 18, etc. That is, the control unit 20 actuates, based on operation of the remote controller 10, the nozzle drive device 12 and the water mass generation device 14 such that cleansing water is sprayed to a predetermined water splash point on the human body. Specifically, the control unit 20 includes a microprocessor, a memory, an interface circuit, and software for actuating these components (these components are not shown), for example.

The seating sensor 22 is a load sensor disposed in the toilet seat 4, and is configured to detect whether or not the user is seated on the toilet seat 4. Moreover, in the present embodiment, the seating sensor 22 detects a load acting on the toilet seat 4 so that it can be detected whether or not the user corrects a seating position on the toilet seat 4.

Next, the configuration of the nozzle drive device 12 will be described with reference to FIGS. 3 to 6.

Figure 3:
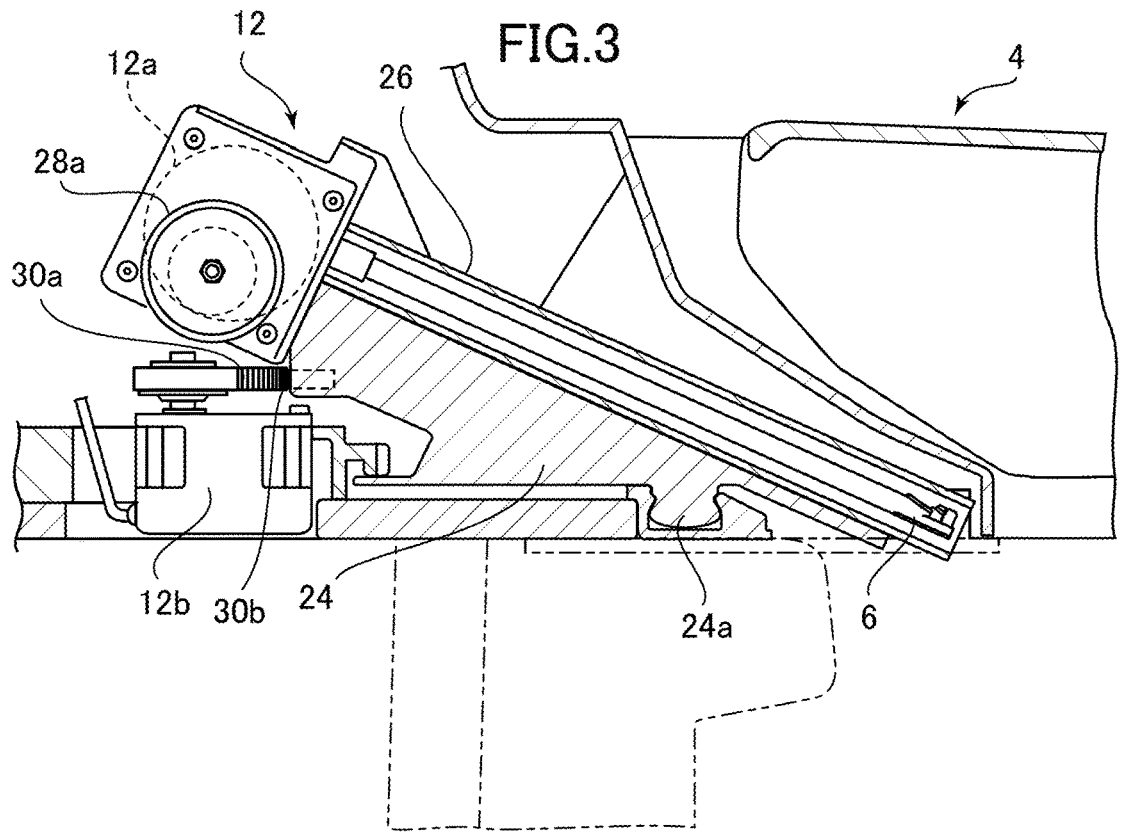
FIG. 3 is a side cross-sectional view of a nozzle drive device provided at the sanitary cleansing device of the embodiment of the present invention.
Figure 4:
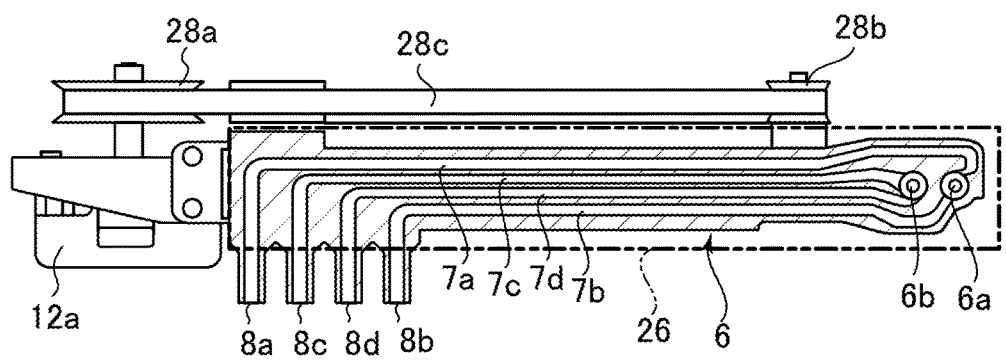
FIG. 4 is a top view of the nozzle drive device with a partial cutaway view of the nozzle drive device.
Figure 5:
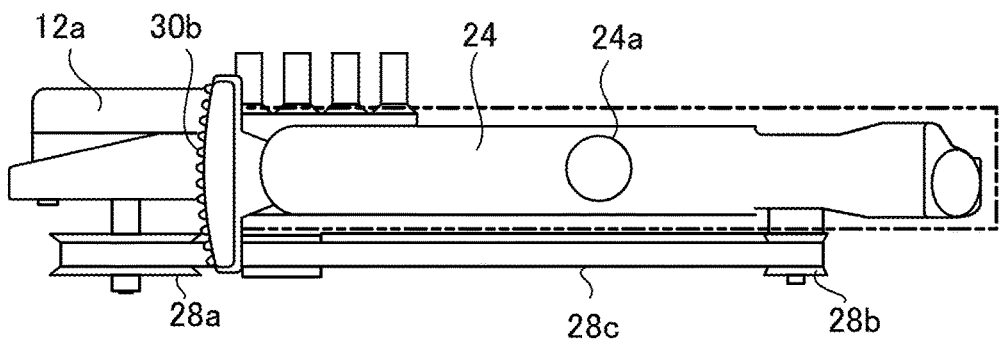
FIG. 5 is a bottom view of the nozzle drive device.

FIG. 3 is a side cross-sectional view of the nozzle drive device 12, and FIG. 4 is a top view of the nozzle drive device 12 with a partial cutaway view of the nozzle drive device 12. Moreover, FIG. 5 is a bottom view of the nozzle drive device 12, FIG. 6A is an enlarged plan cross-sectional view of the tip end portion of the nozzle assembly 6, and FIG. 6B is an enlarged side cross-sectional view of the tip end portion.

As illustrated in FIG. 3, the nozzle drive device 12 includes a base member 24, a holding cylinder 26 attached to the base member 24, the nozzle assembly 6 slidably disposed in the holding cylinder 26, the nozzle front-to-back drive motor 12a configured to move the nozzle assembly 6 back and forth, and the nozzle right-to-left drive motor 12b configured to move the spray port in the right-to-left direction.

The base member 24 is a member attached to the toilet seat 4 to rotate about a rotary shaft 24a. The holding cylinder 26 is fixed obliquely forward and downward to the base member 24. The holding cylinder 26 is a cylindrical member, and the nozzle assembly 6 is disposed to move back and forth in the holding cylinder 26.

Moreover, the nozzle front-to-back drive motor 12a is attached to a back end portion of the base member 24. A drive pulley 28a is attached to an output shaft of the nozzle front-to-back drive motor 12a, whereas a driven pulley 28b is rotatably attached to a front end portion of the base member 24 (FIG. 4). A timing belt 28c extending along the holding cylinder 26 is wound parallel to the holding cylinder 26 between the drive pulley 28a and the driven pulley 28b. With this configuration, when the nozzle front-to-back drive motor 12a is actuated, the drive pulley 28a rotates to feed the timing belt 28c.

The nozzle assembly 6 is a columnar assembly disposed in the holding cylinder 26. A first spray port 6a and a second spray port 6b are provided at an upper surface of the tip end portion of the nozzle assembly 6, and a water supply path for guiding cleansing water to each spray port is formed in the nozzle assembly 6. Specifically, a first water supply path 7a and a second water supply path 7b for guiding cleansing water to the first spray port 6a and a third water supply path 7c and a fourth water supply path 7d for guiding cleansing water to the second spray port 6b are provided respectively as illustrated in FIG. 4. The sanitary cleansing device 1 of the present embodiment is configured to switch the water supply path for supplying cleansing water, thereby executing various cleansing modes. Moreover, at a side surface of a base end portion of the nozzle assembly 6, a first connection portion 8a, a second connection portion 8b, a third connection portion 8c, and a fourth connection portion 8d are each provided to connect a cleansing water supply pipe (not shown) to a corresponding one of the first to fourth water supply paths. The third connection portion 8c is connected to the cleansing water supply pipe (not shown) connected to the water mass generation device 14, and therefore, cleansing water flowing from the third connection portion 8c to the third water supply path 7c is subjected to pulsation.

Moreover, as illustrated in FIG. 4, a side surface of a back end portion of the nozzle assembly 6 is coupled to the timing belt 28c, and the nozzle front-to-back drive motor 12a is driven so that the nozzle assembly 6 can move back and forth from the holding cylinder 26.

When the nozzle assembly 6 slidable in the holding cylinder 26 advances forward and downward, each spray port formed at the tip end portion is positioned below the private area of the user seated on the toilet seat 4. When cleansing water is supplied to the advanced nozzle assembly 6, the cleansing water is sprayed obliquely upward through each spray port from the back side to the front side of the seated user, thereby cleansing the private area of the user. While cleansing water is being sprayed, normal/reverse rotation of the nozzle front-to-back drive motor 12a is repeated so that the nozzle assembly 6 can slide a predetermined distance in the front-to-back direction. Thus, the water splash point of the sprayed cleansing water can reciprocate on the human body in the front-to-back direction.

Next, as illustrated in FIG. 3, the nozzle right-to-left drive motor 12b is attached to a body side of the toilet seat 4, and a drive gear 30a is attached to an output shaft of the nozzle right-to-left drive motor 12b. Meanwhile, at the back end portion of the base member 24, an arc-shaped gear 30b (FIG. 5) is provided to engage with the drive gear 30a. The arc-shaped gear 30b is formed in an arc shape about the rotary shaft 24a of the base member 24. Thus, when the nozzle right-to-left drive motor 12b is actuated, the drive gear 30a moves the arc-shaped gear 30b, and then, the base member 24 rotates about the rotary shaft 24a. When the base member 24 rotates with the nozzle assembly 6 being advanced, the position of each spray port provided at the tip end portion of the nozzle assembly 6 also rotates about the rotary shaft 24a. In this state, each spray port is apart from the rotary shaft 24a, and the angle of rotation of the base member 24 is extremely small. Thus, by rotation of the base member 24, each spray port can move in the substantially right-to-left direction of the seated user. In the present specification, the phrasing of moving in the right-to-left direction means movement including such a component in the right-to-left direction.

Next, a configuration of each spray port provided at the nozzle assembly 6 will be described with reference to FIGS. 6A and 6B.

As illustrated in FIG. 6A, the first water supply path 7a and the second water supply path 7b are each connected to the first spray port 6a. Moreover, a swirl chamber 32 with an annular cross section is provided at an inlet portion of the first spray port 6a, and cleansing water supplied from the first and second water supply paths is sprayed from the first spray port 6a through the swirl chamber 32 respectively. As illustrated in FIG. 6B, a tapered flow path 32a is provided on a downstream side of the swirl chamber 32 with the annular cross section, and a tip end of the tapered flow path 32a is connected to the cylindrical first spray port 6a. Further, a cylindrical throat flow path 36 is provided on a downstream side of the first spray port 6a.

As illustrated in FIG. 6A, the second water supply path 7b is a flow path connected in the direction of tangent of a circle forming the swirl chamber 32, and therefore, cleansing water supplied from the second water supply path 7b turns into a strong swirl flow in the swirl chamber 32, and then, flows upward in the tapered flow path 32a. Then, the cleansing water is sprayed as hollow conical discharged water from the first spray port 6a. The hollow conical discharged water sprayed from the first spray port 6a is sprayed in a mist form from the throat flow path 36. The mechanism for generating mist from the hollow conical discharged water by the throat flow path 36 will be described later. On the other hand, the first water supply path 7*a* is a flow path connected in the radial direction of the circle forming the swirl chamber 32, and therefore, cleansing water supplied from the first water supply path 7*a* flows upward in the tapered flow path 32*a* without turning into a strong swirl flow, and then, is sprayed from the first spray port 6*a*. At this point, external air is, by an ejector effect, drawn through an air suction port 32*b* provided between the first spray port 6*a* and the throat flow path 36, and cleansing water sprayed from the throat flow path 36 turns into discharged water foam containing many micro air bubbles.

On the other hand, as illustrated in FIG. 6A, the third water supply path 7*c* and the fourth water supply path 7*d* are each connected to the second spray port 6*b*. Moreover, a swirl chamber 34 with an annular cross section is provided at an inlet portion of the second spray port 6*b*, and cleansing water supplied from the third and fourth water supply paths is sprayed from the second spray port 6*b* through the swirl chamber 34. As illustrated in FIG. 6B, a tapered flow path 34*a* is provided on a downstream side of the swirl chamber 34 with the annular cross section, and a tip end of the tapered flow path 34*a* is connected to the second spray port 6*b*. Further, a tapered conical throat flow path 38 is provided on a downstream side of the second spray port 6*b*.

As illustrated in FIG. 6A, the fourth water supply path 7*d* is a flow path connected in the direction of tangent of a circle forming the swirl chamber 34, and therefore, cleansing water supplied from the fourth water supply path 7*d* turns into a weak swirl flow in the swirl chamber 34, and then, flows upward in the tapered flow path 34*a*. Then, the cleansing water is sprayed from the second spray port 6*b*. At this point, external air is, by the ejector effect, drawn through an air suction port (not shown) provided between the second spray port 6*b* and the throat flow path 38, and cleansing water sprayed from the second spray port 6*b* turns into discharged water foam containing many micro air bubbles. On the other hand, the third water supply path 7*c* is a flow path connected in the radial direction of the circle forming the swirl chamber 34, and therefore, cleansing water supplied from the third water supply path 7*c* flows upward in the tapered flow path 34*a* without forming a swirl flow, and then, is sprayed from the second spray port 6*b*. At this point, the water mass generation device 14 pulsates the flow velocity of cleansing water supplied to the third water supply path 7*c*, and therefore, cleansing water sprayed from the second spray port 6*b* is, as water masses, splashed on the human body. The mechanism for forming water masses by pulsation will be described later.

Figure 7:
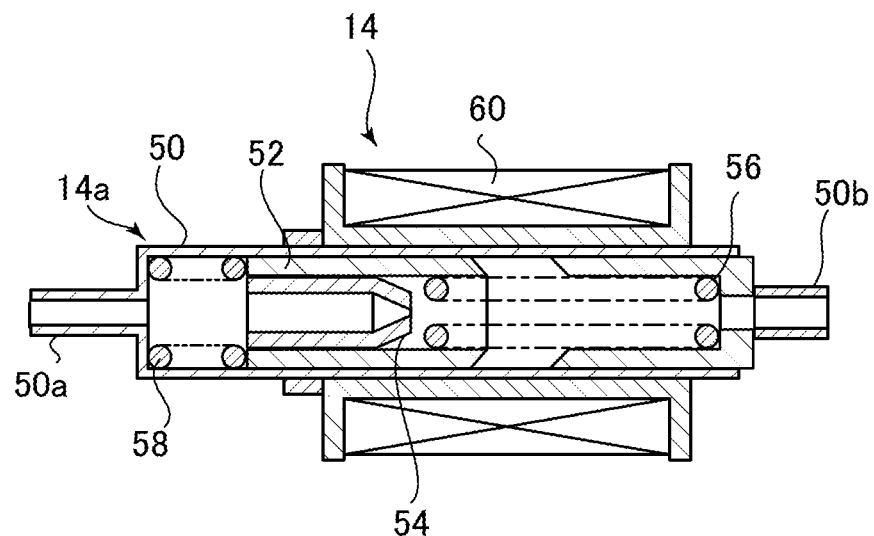
FIG. 7 is a schematic cross-sectional view of a solenoid valve built in a water mass generation device provided at the sanitary cleansing device of the embodiment of the present invention.

Next, a configuration and an operating principle of the water mass generation device 14 built in the functional section 9 will be described with reference to FIGS. 7 and 8. FIG. 7 is a schematic cross-sectional view of the solenoid valve 14*a* provided at the water mass generation device 14, and FIGS. 8(*i*) and 8(*ii*) are schematic views of the state of cleansing water sprayed from the second spray port 6*b*.

The water mass generation device 14 is provided on an upstream side of the nozzle assembly 6, and is configured to change the flow velocity of inflow cleansing water supplied from the tap water line in predetermined cycles to provide pulsation to cleansing water sprayed from the second spray port 6*b*.

As illustrated in FIG. 7, the solenoid valve 14*a* provided at the water mass generation device 14 includes a cylinder 50, a plunger 52 slidably disposed in the cylinder 50, a check valve 54 attached to the plunger 52, a return spring 56 and a buffer spring 58 configured to provide predetermined biasing force to the plunger 52, and a pulsation generation coil 60 configured to provide electromagnetic force to the plunger 52.

The cylinder 50 is a cylindrical member. The plunger 52 is slidably disposed in the cylinder 50, and reciprocates in the cylinder 50. Cleansing water supplied from the tap water line and having passed through the water supply valve 18 (FIG. 2) etc. flows into an inlet port 50*a* provided at one end of the cylinder 50. An outlet port 50*b* at the other end of the cylinder 50 is connected to a connection portion 6*c* of the nozzle assembly 6 (FIG. 4), and cleansing water subjected to pulsation by the water mass generation device 14 is supplied to the nozzle assembly 6.

The plunger 52 is a cylindrical metal member. By application of excitation current to the pulsation generation coil 60, the electromagnetic force acts such that the plunger 52 is attracted toward a downstream side (the right side as viewed in FIG. 7) in the cylinder 50. Moreover, the return spring 56 and the buffer spring 58 are arranged respectively on downstream and upstream sides of the plunger 52 such that the predetermined biasing force is provided to the plunger 52. With this configuration, when the excitation current flows through the pulsation generation coil 60, the plunger 52 moves to the downstream side against the biasing force of the return spring 56. When application of the excitation current is stopped, the plunger 52 is pushed back to the upstream side by the biasing force of the return spring 56. Moreover, when the plunger 52 is pushed back to the upstream side, the buffer spring 58 buffers contact of the plunger 52 with an end surface of the cylinder 50.

Meanwhile, the duckbill check valve 54 is attached to the inner periphery of the plunger 52. The check valve 54 reduces a backflow of cleansing water from the downstream side to the upstream side of the plunger 52 in the cylinder 50.

The pulsation generation coil 60 is a solenoid coil disposed to surround the periphery of the cylinder 50. Upon power distribution to the pulsation generation coil 60, the electromagnetic force is provided to the plunger 52, and therefore, the plunger 52 moves to the downstream side. In the present embodiment, pulsed current with a predetermined frequency is applied to the pulsation generation coil 60, and the electromagnetic force generated by such current and the biasing force of the return spring 56 reciprocate the plunger 52 in the cylinder 50.

When the plunger 52 moves to the downstream side by such reciprocation, the backflow from the downstream side to the upstream side of the plunger 52 is reduced by the check valve 54. Thus, the downstream pressure of the cylinder 50 is higher than the supply pressure of cleansing water on an upstream side of the cylinder 50, and the flow velocity of cleansing water flowing out from the cylinder 50 increases. Conversely, when the plunger 52 is pushed back to the upstream side, the downstream pressure of the cylinder 50 reaches lower than the supply pressure, and the flow velocity of outflow cleansing water decreases. However, cleansing water on the upstream side of the plunger 52 can flow to the downstream side through the check valve 54, and therefore, the backflow of cleansing water due to negative pressure on the downstream side does not occur. By reciprocation of the plunger 52 by the check valve 54 as described above, cleansing water flowing out from the cylinder 50 results in a pulsating flow with a flow velocity changing in the predetermined cycles.

Next, the principle of formation of water masses from cleansing water subjected to pulsation by the solenoid valve 14*a* will be described with reference to FIGS. 8(*i*) and 8(*ii*).

Figure 8:
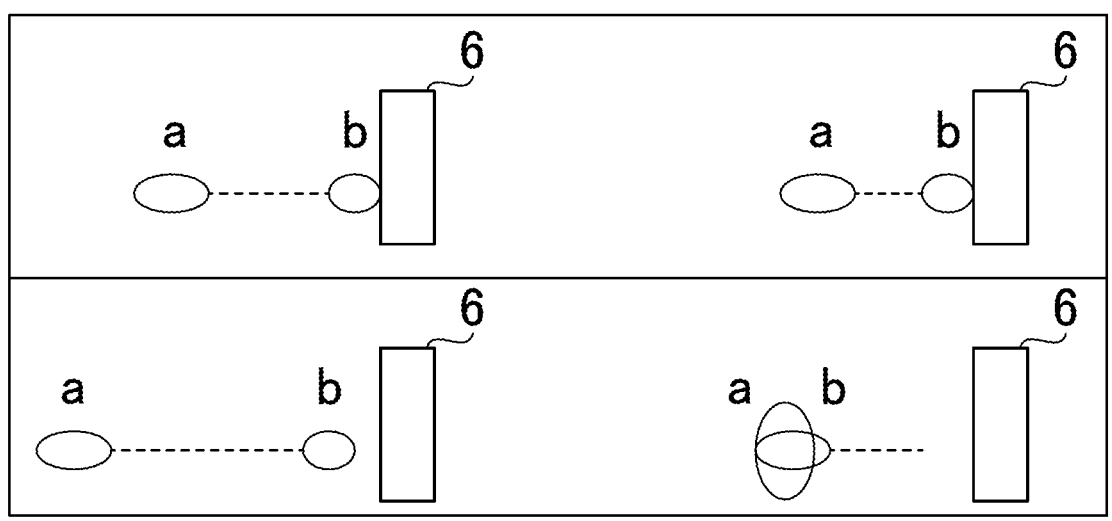
FIG. 8 is a schematic view of the state of cleansing water sprayed from a spray port.

FIGS. 8(i) and 8(ii) are the schematic views of the state of cleansing water sprayed from the second spray port 6b, and illustrate the state of cleansing water at each moment of the pulsating flow with the periodically-changing flow velocity. An upper side in each figure illustrates the state right after spraying from the second spray port 6b, and a lower side in each figure illustrates the state right before sprayed cleansing water reaches the private area of the human body.

FIG. 8(i) illustrates the state of cleansing water sprayed from the second spray port 6b during a period (a period in which the plunger 52 is pushed back to the upstream side) in which the flow velocity decreases. In this state, since the flow velocity tends to decrease, cleansing water a sprayed ahead has a higher spray speed than that of cleansing water b sprayed later. Until reaching the human body, the cleansing water a sprayed ahead distances itself from the cleansing water b sprayed later, and the continuously-sprayed cleansing water intermittently reaches the human body (the lower side in (i)).

On the other hand, FIG. 8(ii) illustrates a period (a period in which the plunger 52 is accelerated from the upstream side to the downstream side) in which the flow velocity increases. In this state, the flow velocity of cleansing water a initially sprayed in this period is extremely low, and the flow velocity of cleansing water b subsequently sprayed gradually increases. Thus, until reaching the human body, the cleansing water b sprayed later catches up with the cleansing water a sprayed ahead, and a great water mass (volume of water, drops of water) reaches the human body (the lower side in (ii)). As described above, the flow velocity of cleansing water sprayed from the second spray port 6b is pulsated. Therefore, the phenomenon of catching up with cleansing water occurs, and the masses of cleansing water are continuously splashed on the human body at the predetermined time intervals.

Note that if a great mass of cleansing water generated by the catching-up phenomenon soars without being splashed on, e.g., the human body right after the water mass has been generated, such a water mass is broken into small droplets. In the present embodiment, pulsation by the water mass generation device 14 is set such that a great water mass is formed at a point about 6 cm apart from the nozzle assembly 6 (the spray port), assuming that the private area of the human body is positioned at the above-described point in cleansing. Moreover, the water mass size mentioned in the present specification relates to the water mass size at the assumed position of the private area of the human body in cleansing. At other positions than such an assumed position, a water mass is not necessarily formed, or a water mass with a different size is formed.

Further, in the present embodiment, a pulsed voltage of 70 to 100 Hz is applied to the pulsation generation coil 60, and the plunger 52 reciprocates with this frequency. Thus, in the present embodiment, 70 to 100 masses of cleansing water sprayed from the second spray port 6b continuously reach the human body every second. In this case, since a great cleansing water mass generated by the catching-up phenomenon is splashed on the human body, a stronger stimulus is provided to the skin of the human body as compared to the case of continuously splashing the same flow rate of cleansing water which is not in a water mass form, and a sufficient feeling of cleansing water weight can be provided. Thus, a sufficient feeling of cleansing can be provided to the user even with a small flow rate. Moreover, since cleansing water is continuously splashed on the human body at a frequency of about 70 to 100 water masses per second, the user does not clearly feel that separate water masses are splashed, but substantially feels continuous contact of cleansing water.

The water mass size generated by the water mass generation device 14, the time interval for water mass generation, and the speed (the flow velocity) of each water mass splashed on the human body can be set in such a manner that, e.g., the frequency, amplitude, and duty ratio of the voltage pulse applied to the pulsation generation coil 60 of the solenoid valve 14a and the pressure of water supply to the cylinder 50 are optionally changed. Moreover, the size of each water mass to be generated can be periodically changed in such a manner that the pulse width of the voltage pulse applied to the pulsation generation coil 60 is periodically changed.

Note that in the present embodiment, the solenoid valve is used to generate the pulsating flow, but the pulsating flow can be generated by other devices. For example, cleansing water is periodically pressurized by, e.g., a piston pump including one or more pistons and cylinders, and in this manner, the pulsating flow can be formed. Alternatively, the pulsating flow can be formed by a balloon jet fluid element configured to periodically generate air bubbles in a water passage to periodically change water passing resistance by the air bubbles, thereby pulsating the flow velocity.

Next, each cleansing mode executed by the sanitary cleansing device 1 of the embodiment of the present invention will be described with reference to FIGS. 9 to 27.

Figure 9:
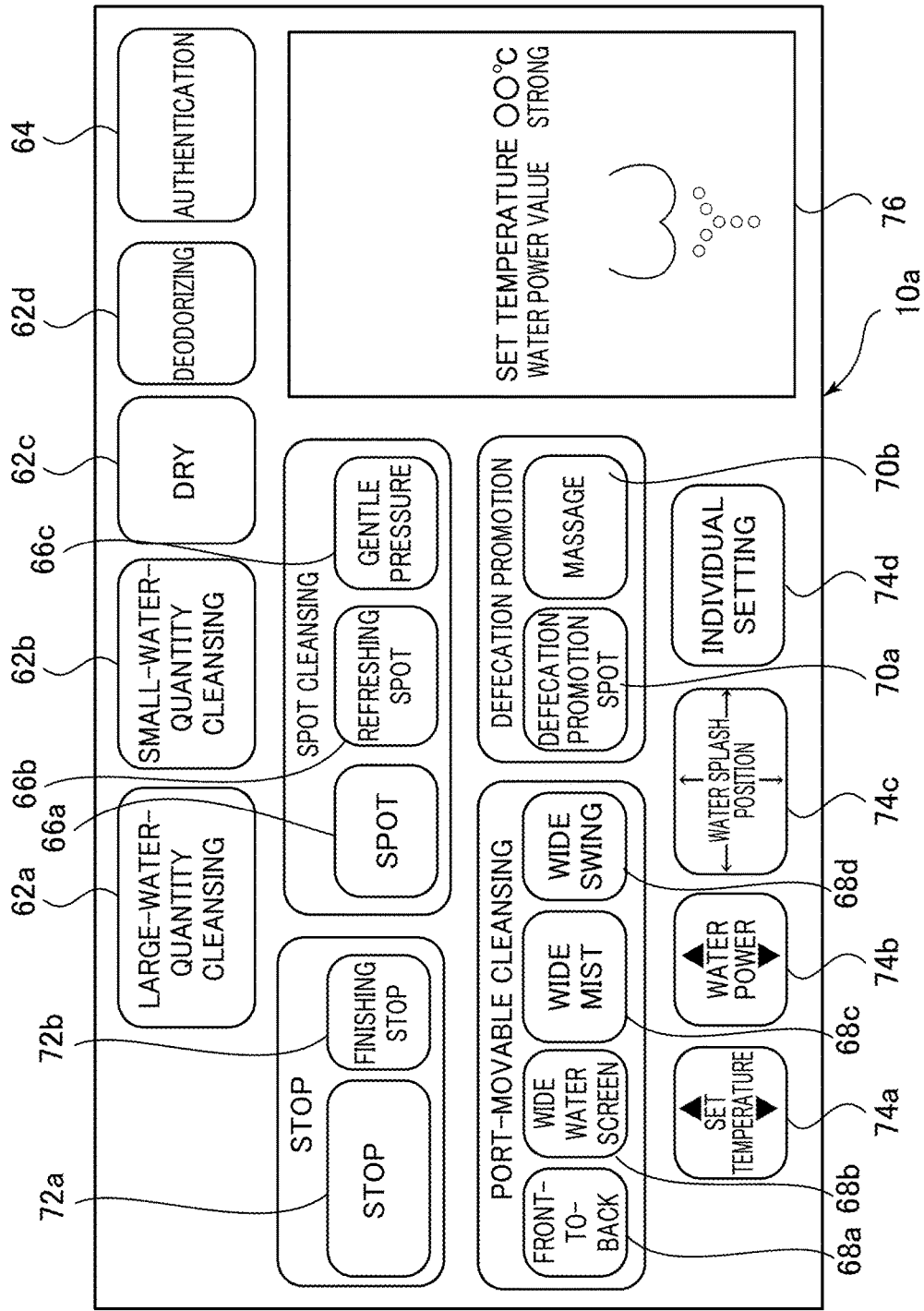
FIG. 9 is a view of an example of a screen displayed on a touch panel of a remote controller provided at the sanitary cleansing device of the embodiment of the present invention.

FIG. 9 is a view of an example of a screen displayed on the touch panel 10a of the remote controller 10.

Each cleansing mode described below is executed in such a manner that the control unit 20 built in the functional section 9 actuates, based on the control signal from the remote controller 10, the nozzle drive device 12, the water mass generation device 14, and the water supply valve 18 configured to supply the nozzle assembly 6 with cleansing water.

As illustrated in FIG. 9, a large-water-quantity cleansing button 62a, a small-water-quantity cleansing button 62b, a dry button 62c, and a deodorizing button 62d are displayed on the touch panel 10a. The large-water-quantity cleansing button 62a and the small-water-quantity cleansing button 62b are buttons for flushing the bowl portion 2a of the water closet body 2 with cleansing water for cleansing the water closet to cleanse the bowl portion 2a. The dry button 62c is a button for blowing hot air to the private area of the user to dry the private area wetted by cleansing of the private area. The deodorizing button 62d is a button for actuating a deodorizing device (not shown) built in the functional section 9 to deodorize, e.g., the inside of the bowl portion 2a.

Further, an authentication button 64 is displayed on the touch panel 10a. The authentication button 64 is a button for identifying the user of the sanitary cleansing device 1 to call various settings for the user, such as the temperature, power, and water splash position of cleansing water of the sanitary cleansing device 1. These various settings called by the authentication button 64 are displayed on a display portion 76 below the authentication button 64. The display portion 76 displays not only various setting values, but also an icon of an image of each executed cleansing mode. Thus, the cleansing mode selected by the user oneself can be recognized at a glance. Moreover, various settings for each user can be made in such a manner that an individual setting button 74d at a lower end of the touch panel 10a is operated. With this configuration, settings of the sanitary cleansing device 1 placed at a residence and used by multiple individuals can be separately made for each individual.

Moreover, for performing spot cleansing, a spot button 66a, a refreshing spot button 66b, and a gentle pressure button 66c are displayed on the touch panel 10a. These spot cleansing modes are cleansing modes executed in the state in which the first spray port 6a or the second spray port 6b from which cleansing water is sprayed is stopped below the private area of the human body. Thus, in these cleansing modes, the water splash point of cleansing water on the human body does not substantially move. Cleansing executed by operation of each of the above-described buttons will be described in detail below.

In addition, for performing port-movable cleansing, a front-to-back button 68a, a wide water screen button 68b, a wide mist button 68c, and a wide turning button 68d are displayed on the touch panel 10a. These port-movable cleansing modes are cleansing modes executed while the first spray port 6a or the second spray port 6b from which cleansing water is sprayed is being moved below the private area of the human body by the nozzle drive device 12. Thus, in each port-movable cleansing mode, the water splash point of cleansing water on the human body moves only in the front-to-back direction of the seated human body, or moves in the front-to-back direction and the right-to-left direction of the seated human body. Strictly speaking, movement of the first spray port 6a and the second spray port 6b by the nozzle drive device 12 is made in a radial direction and a circumferential direction of a circle about the rotary shaft 24a (FIG. 5), but these directions are referred to as the "front-to-back direction" and the "right-to-left direction" in the present specification. Cleansing executed by operation of each of the above-described buttons will be described in detail below.

Moreover, for promoting defecation, a defecation promotion spot button 70a and a massage button 70b are displayed on the touch panel 10a. These defecation promotion cleansing modes are cleansing modes for providing a predetermined stimulus to the private area of the human body to promote defecation. Cleansing executed by operation of each of the above-described buttons will be described in detail below.

When the user operates any of these buttons for "spot cleansing," "port-movable cleansing," and "defecation promotion," spraying of cleansing water from the spray port begins.

Further, for performing stop operation, a stop button 72a and a finishing stop button 72b are displayed on the touch panel 10a. The stop button 72a is a button for stopping drying, deodorization, and various cleansing modes executed by the sanitary cleansing device 1. When the finishing stop button 72b is operated, the cleansing mode is automatically stopped after execution of a cleansing mode of a predetermined stop sequence set in advance. Note that when the finishing stop button 72b is operated in the state in which the cleansing mode by the sanitary cleansing device 1 is not executed, the predetermined stop sequence is also executed, and then, is automatically stopped.

In addition, a set temperature button 74a, a water power button 74b, and a water splash position button 74c are displayed at the lower end of the touch panel 10a. The set temperature button 74a is a button for setting the temperature of cleansing water sprayed from the first spray port 6a or the second spray port 6b, and the water power button 74b is a button for setting the power (the flow velocity) of cleansing water sprayed from the first spray port 6a or the second spray port 6b. Moreover, the water splash position button 74c is a button for moving, in the front-to-back direction and the right-to-left direction, a reference position of the human body on which cleansing water is splashed.

Next, the port-movable cleansing modes will be described with reference to FIGS. 10 to 16. Each port-movable cleansing mode is a cleansing mode executed when the front-to-back button 68a, the wide water screen button 68b, the wide mist button 68c, or the wide turning button 68d is operated.

Figure 10A:
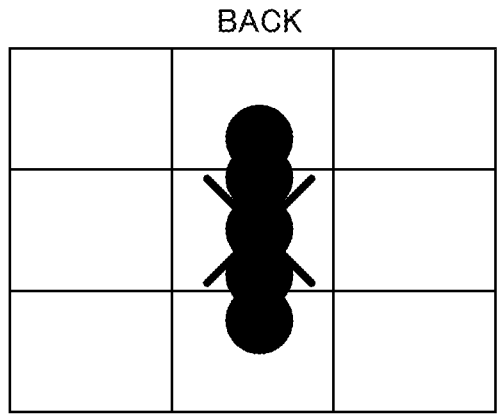
FIG. 10A is a view for describing cleansing when a front-to-back button is operated.

First, cleansing upon operation of the front-to-back button 68a will be described with reference to FIG. 10A. In FIG. 10A, the water splash point of cleansing water is indicated by a black circle mark. Moreover, a point of a cross mark of FIG. 10A indicates the center position of the private area of the human body.

When the front-to-back button 68a is operated, the control unit 20 actuates the water mass generation device 14 and the nozzle drive device 12, and switches a water path such that supplied tap water flows into the nozzle assembly 6 from the third connection portion 8c through the water mass generation device 14 and is sprayed from the second spray port 6b through the third water supply path 7c. Accordingly, the cleansing water sprayed from the second spray port 6b is, as water masses, continuously splashed on the human body.

Moreover, when the front-to-back button 68a is operated, the control unit 20 actuates only the nozzle front-to-back drive motor 12a of the nozzle drive device 12 to reciprocate the nozzle assembly 6 in the front-to-back direction as illustrated in FIG. 10A. Accordingly, the second spray port 6b reciprocates about the predetermined reference private area position in the front-to-back direction, and the water splash point of the cleansing water on the human body also reciprocates about the private area of the human body in the front-to-back direction. Note that in the state in which the spray port is positioned at the reference private area position, sprayed cleansing water is directed to the point of the cross mark of FIG. 10A to cleanse the center of the private area, assuming that the private area (the anus) of the human body seated on the toilet seat 4 is positioned at the point of the cross mark of FIG. 10A. When the water splash position button 74c changes the water splash position, the spray port reciprocates about the changed reference private area position.

Figure 10B:
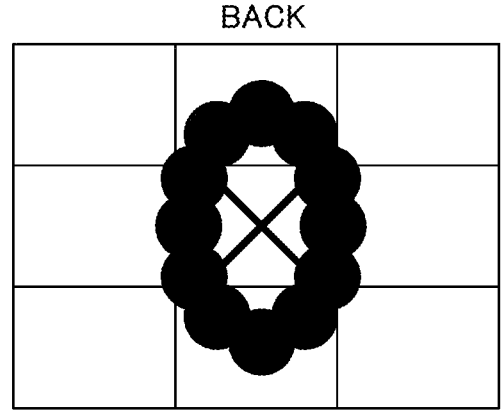
FIG. 10B is a view for describing cleansing when a wide turning button is operated.

Next, cleansing upon operation of the wide turning button 68d will be described with reference to FIG. 10B.

When the wide turning button 68d is operated, cleansing water is sprayed from the second spray port 6b through the water mass generation device 14, the third connection portion 8c, and the third water supply path 7c. Moreover, as illustrated in FIG. 10B, when the wide turning button 68d is operated, a wide turning cleansing mode is executed, and the control unit 20 synchronously actuates the nozzle front-to-back drive motor 12a and the nozzle right-to-left drive motor 12b of the nozzle drive device 12 such that the second spray port 6b revolves around the reference private area position along a circular or oval track. Accordingly, the water splash point of the cleansing water sprayed from the second spray port 6b moves to revolve around the center of the private area indicated by a cross mark in FIG. 10B.

Next, cleansing in a wide water screen cleansing mode executed upon operation of the wide water screen button 68b will be described with reference to FIGS. 10C to 14.

Figure 10C:
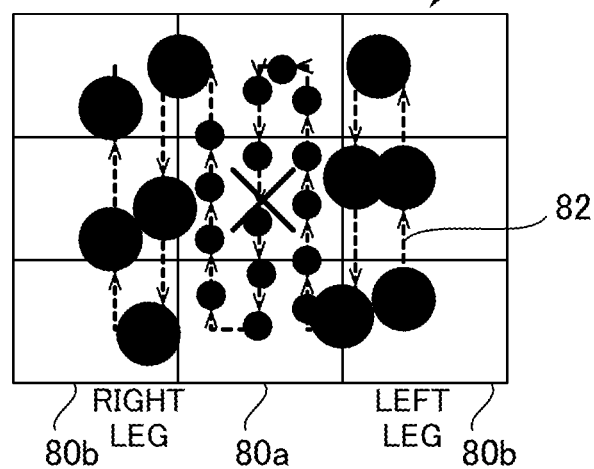
FIG. 10C is a schematic view of a cleansing region of a human body cleansed by the sanitary cleansing device.

FIG. 10C schematically illustrates a cleansing region 80 of the human body cleansed by the sanitary cleansing device 1. FIG. 10 D is a time chart of an actuation status of each device during cleansing.

In FIG. 10C, the water splash point is indicated by a black circle mark, and movement of the water splash point is indicated by dashed arrows. Moreover, a point of a cross mark of FIG. 10C indicates the center position of the private area of the human body, and cleansing water is splashed on the point of the cross mark in the state in which the spray port is positioned at the reference private area position. Further, as viewed in FIG. 10C, an upper side corresponds to the back side of the human body seated on the toilet seat 4, a lower side corresponds to the front side (the abdomen side) of the human body, the left leg is positioned on a lower right side, and the right leg is positioned on a lower left side. In addition, in the present specification, a region of the cleansing region 80 extending in the front-to-back direction of the human body and including the private area is referred to as a "center region 80a," and each side region of the center region 80a is referred to as a "side region 80b." Note that the positions, number, and sizes of the water splash points and a movement path of the splash point in FIG. 10C are schematically illustrated for the sake of illustration.

When the wide water screen button 68b is operated, the control unit 20 controls the nozzle drive device 12 to repeatedly reciprocate the water splash point in the substantially front-to-back direction of the human body to sweep the inside of the cleansing region while moving the water splash point in the substantially right-to-left direction of the human body. That is, in the present embodiment, the nozzle drive device 12 is, as illustrated in FIG. 10C, actuated such that movement in the substantially front-to-back direction of the human body and movement in the substantially right-to-left direction are alternately repeated, a moving distance in movement in the substantially right-to-left direction being shorter than that in movement in the substantially front-to-back direction. Since the nozzle drive device 12 is actuated as described above, the water splash point of cleansing water moves in two directions including the front-to-back direction and the right-to-left direction, and the inside of the cleansing region 80 is swept in a movement pattern 82 as illustrated in FIG. 10C. That is, as illustrated in FIG. 10C, after having moved from the front to the back at a constant moving speed, the water splash point slightly moves to the left. Then, after having moved from the back to the front, the water splash point slightly moves to the left. Repeated movement described above results in a single process of movement pattern 82 as illustrated in FIG. 10C, and such a movement pattern 82 is repeated. Note that movement in the front-to-back direction and movement in the right-to-left direction are alternately repeated in the movement pattern illustrated in FIG. 10C, but a movement pattern in which movement in the front-to-back direction and movement in the right-to-left direction are simultaneously performed to move the water splash point in an oblique direction can be used. As described above, the water splash point reciprocates in the front-to-back direction while moving in the right-to-left direction little by little. In this manner, a zigzag movement pattern is formed.

Figure 10D:
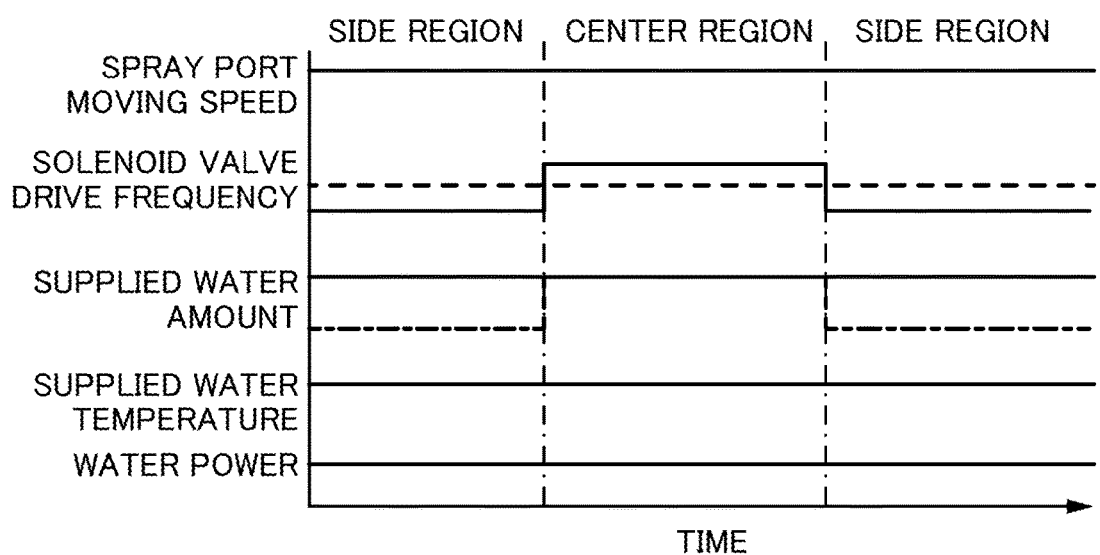
FIG. 10D is a time chart of an actuation status of each device in cleansing.

As illustrated in FIG. 10D, the control unit 20 actuates the water mass generation device 14 in synchronization with actuation of the nozzle drive device 12. That is, the control unit 20 sets a low drive frequency (the frequency of reciprocation of the plunger 52) of the solenoid valve 14a of the water mass generation device 14 while the water splash point is within the side region 80b, and sets a high drive frequency while the water splash point is within the center region 80a. With this configuration, the time interval of water mass splashing is different between the center region 80a and the side region 80b, and each water mass splashed on the center region 80a of the cleansing region 80 is smaller than each water mass splashed on the side region 80b of the cleansing region 80. As a result, the amount of splashed cleansing water per unit area is greater in the center region 80a than in the side region 80b.

Note that the drive frequency of the solenoid valve 14a indicated by a dashed line in FIG. 10D is a drive frequency during spot cleansing (executed by operation of the spot button 66a) performed with the second spray port 6b being stopped. In each port-movable cleansing mode, the drive frequency of the solenoid valve 14a while the side region 80b is being cleansed is lower than that in spot cleansing, and the drive frequency while the center region 80a is being cleansed is set higher than that in spot cleansing.

On the other hand, the moving speed of the second spray port 6b, the flow rate (the supplied water amount) of cleansing water sprayed from the second spray port 6b, the temperature (the supplied water temperature) of cleansing water, and the flow velocity (the power) of cleansing water are maintained constant as illustrated in FIG. 10D. Note that the moving speed of the second spray port 6b is constant, and therefore, the moving speed of the water splash point in the cleansing region 80 is also constant.

Moreover, as indicated by a chain line in FIG. 10D, the degree of opening of the water supply valve 18 (FIG. 2) is changed so that the supplied water amount while the side region 80b is being cleansed can be set smaller than that while the center region 80a is being cleansed. With a smaller supplied water amount in the side region 80b, water masses with the substantially same size as that of the center region 80a are formed in the side region 80b in which the drive frequency of the solenoid valve 14a is lower.

As described above, the interval between the water splash points of water masses in the center region 80a is shorter than that in the side region 80b, and therefore, the number of water splash points in the center region 80a is greater than that in the side region 80b. As a result, the amount of splashed cleansing water per unit area is greater in the center region 80a than in the side region 80b. Thus, an entire cleansing target portion can be covered while the impression of reliably cleansing a portion that the user wishes to cleanse the most can be provided to the user. Consequently, a feeling of satisfaction can be provided to the user. Moreover, since the moving speed of the water splash point is substantially maintained constant, a position different from a position expected by the user is not cleansed, and there is no user's unnecessary insecure feeling. Further, since each water mass splashed on the center region 80a is small, the anus can be cleansed with strong cleansing force. On the other hand, the distance to the water splash point is longer in the side region 80b, and therefore, the speed of each splashed water mass decreases. However, since large water masses are splashed, a sufficient stimulus and a sufficient feeling of weight can be provided to the user, and a sufficient feeling of cleansing can be also provided to the user for the side region 80b.

Figure 11A:
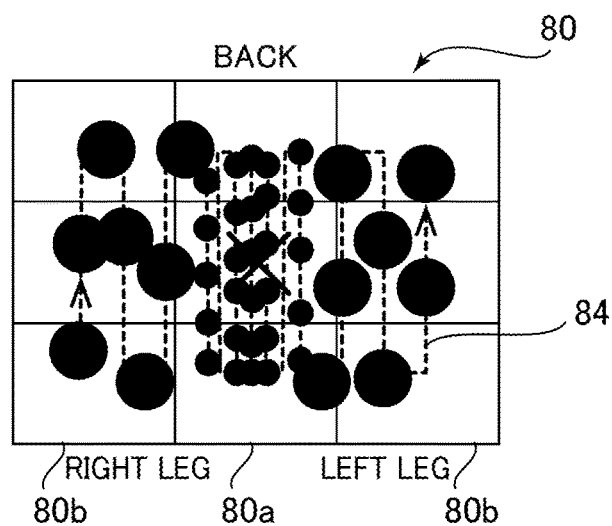
FIG. 11A is a schematic view of the cleansing region of the human body cleansed by the sanitary cleansing device.
Figure 11B:
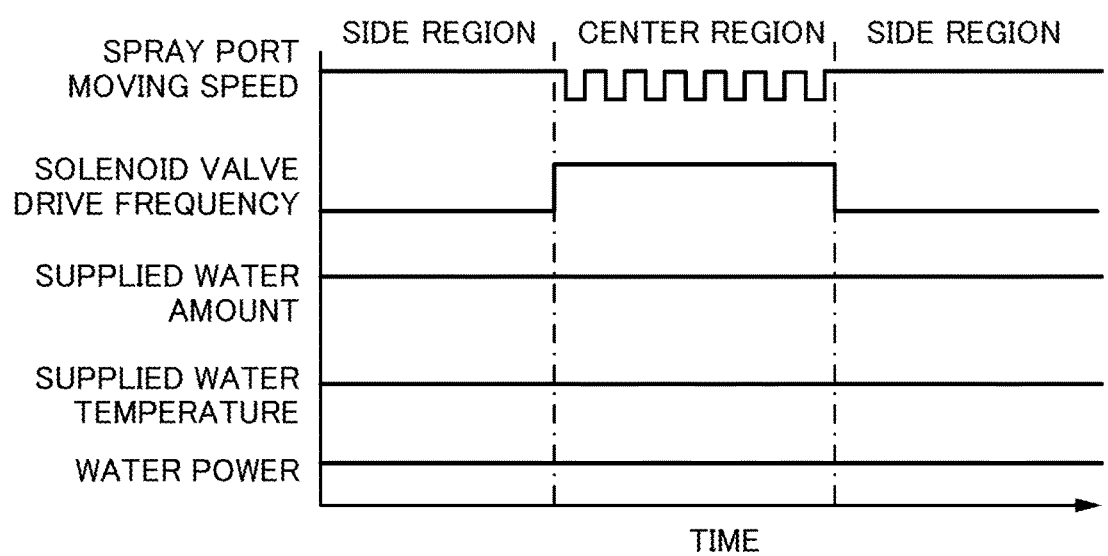
FIG. 11B is a time chart of the actuation status of each device in cleansing.

Next, another cleansing pattern upon operation of the wide water screen button 68b will be described with reference to FIGS. 11A and 11B. FIG. 11A schematically illustrates the cleansing region 80 of the human body cleansed by the sanitary cleansing device 1. FIG. 11B is a time chart of the actuation status of each device during cleansing. Note that in the sanitary cleansing device 1 of the present embodiment, the individual setting button 74d (FIG. 9) on the touch panel 10a is operated such that a detailed setting screen (not shown) is displayed, and various cleansing patterns can be selected as "wide water screen cleansing" on this screen.

In an example illustrated in FIGS. 11A and 11B, a movement pattern 84 in which the moving speed of the second spray port 6b in the right-to-left direction is low (a portion with a lower moving speed in FIG. 11B) is set while the water splash point is in the center region 80*a*. The second spray port 6*b* moves in the movement pattern 84 such that movement of the water splash point in the front-to-back direction is more closely performed (the number of reciprocations is greater) in the center region 80*a* than in the side region 80*b* as illustrated in FIG. 11A. Thus, the interval between the water splash points of water masses is shorter in the center region 80*a* than in the side region 80*b*. As a result, the density of the water splash point of cleansing water is higher in the center region 80*a* than in the side region 80*b*, and the force for cleansing the center region 80*a* including the private area of the human body is stronger. Alternatively, in the case of employing the movement pattern in which movement of the water splash point in the front-to-back direction and movement of the water splash point in the right-to-left direction are simultaneously performed such that the water splash point moves in the oblique direction, the moving speed in the right-to-left direction is lower in the center region 80*a*. With this configuration, the number of reciprocations of the water splash point is greater in the center region 80*a*, and the force for cleansing the center region 80*a* can be increased.

Moreover, in the example illustrated in FIG. 11A, the drive frequency of the solenoid valve 14*a* is set higher in the center region 80*a* than the drive frequency in the side region 80*b*. However, the drive frequency of the solenoid valve 14*a* is, as a variation, maintained constant so that the water mass size can be substantially the same between the center region 80*a* and the side region 80*b*. In the case of actuating the solenoid valve 14*a* as described above, the density of the water splash point of cleansing water becomes higher in the center region 80*a* than the density of the water splash point in the side region 80*b* in such a manner that a right-to-left moving distance in a single process of movement of the second spray port 6*b* in the center region 80*a* is shortened. As a result, the amount of splashed cleansing water per unit area is greater in the center region 80*a* than the amount of splashed cleansing water in the side region 80*b*.

Figure 12:
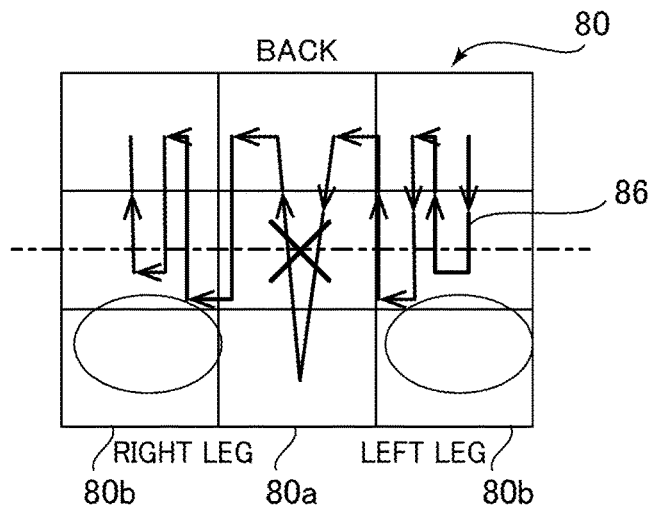
FIG. 12 is a schematic view of the cleansing region of the human body cleansed by the sanitary cleansing device.

Next, still another cleansing pattern upon operation of the wide water screen button 68*b* will be described with reference to FIG. 12. FIG. 12 schematically illustrates the cleansing region 80 of the human body cleansed by the sanitary cleansing device 1.

In an example illustrated in FIG. 12, the control unit 20 actuates the nozzle drive device 12 such that a water splash area is, in the front-to-back direction, larger in the center region 80*a* than a water splash area in the side region 80*b*. That is, the water splash point moves, as illustrated in FIG. 12, in such a movement pattern that movement of the water splash point in the substantially front-to-back direction of the human body and movement of the water splash point in the substantially right-to-left direction of the human body are alternately repeated, the moving distance in movement in the substantially right-to-left direction being shorter than the moving distance in movement in the substantially front-to-back direction. The nozzle drive device 12 is actuated such that the moving distance in the front-to-back direction is longer in the center region 80*a* than the moving distance in the side region 80*b*.

Moreover, the water splash area is, in the front-to-back direction, set shorter in the side region 80*b* than the water splash area in the center region 80*a*, and the water splash area in the side region 80*b* extends to the front of the center position (a position indicated by a cross mark in FIG. 12) of the private area of the human body, assuming that the anus of the human body is positioned at the center position in designing of the sanitary cleansing device 1. That is, the water splash area in the side region 80*b* extends to the front side with respect to a right-to-left straight line (a chain line in FIG. 12) passing through the private area position.

When cleansing water is splashed on a front portion (e.g., an oval portion illustrated in FIG. 12) of the side region 80*b*, some users might feel that the legs get wet by cleansing water splashed on a position having no relation to private area cleansing. For this reason, the user sometimes prefers exclusion of the front portion of the side region 80*b* from the water splash area. However, there is user's insecure feeling that a portion targeted for cleansing is not sufficiently cleansed when the water splash area in the side region 80*b* does not extend to the front side with respect to the right-to-left straight line passing through the private area position. For this reason, the water splash area preferably extends to the front side of the anus position in the side region 80*b*.

In FIG. 12, the right-to-left moving distance of the water splash point at a back end portion of the water splash area is substantially the same between the center region 80*a* and the side region 80*b*. However, the movement pattern can be set, in which the moving distance of the water splash point in the right-to-left direction is shorter in the center region 80*a* than the moving distance in the right-to-left direction in the side region 80*b*. With this configuration, the number of reciprocations of the water splash point in the front-to-back direction is greater in the center region 80*a*, and the density of the water splash point of cleansing water can be higher in the center region 80*a* than the density of the water splash point in the side region 80*b*. As a result, a secure feeling of sufficient cleansing of the center region 80*a* including the private area of the human body can be provided to the user.

The water splash point moves in the front-to-back direction while moving in the right-to-left direction. In this manner, the movement pattern is, as illustrated in FIG. 12, set such that movement in the front-to-back direction changes to diagonally-forward or diagonally-backward movement. With this configuration, an inverted triangular movement pattern (a triangular movement pattern pointed on the front side of the human body) can be formed. As described above, the inside of the cleansing region is swept in the inverted triangular movement pattern, leading to sweeping of the cleansing region with a smaller number of reciprocations. Thus, the frequency of cleansing of the center region can increase, resulting in a sufficient feeling of cleansing of the center region. Note that there is only one inverted triangular movement pattern in the center region 80*a* in FIG. 12, but the movement pattern can be set such that multiple inverted triangular movement patterns are formed for the center region 80*a*. Alternatively, the movement pattern can be set such that one or more inverted trapezoidal movement patterns (trapezoidal movement patterns narrowed on the front side of the human body) are formed for the center region 80*a*.

Although no black circle mark indicating the water splash point is illustrated in FIG. 12, the water mass generation device 14 is preferably actuated such that water masses of cleansing water sprayed from the second spray port are also continuously splashed on the human body at the predetermined time intervals in the movement pattern illustrated in FIG. 12. Moreover, the size of each water mass, the time interval for water mass splashing, and/or the density of splashed water masses are preferably set such that the amount of splashed cleansing water per unit area is greater in the center region 80*a* than in the side region 80*b*.

Figure 13A:
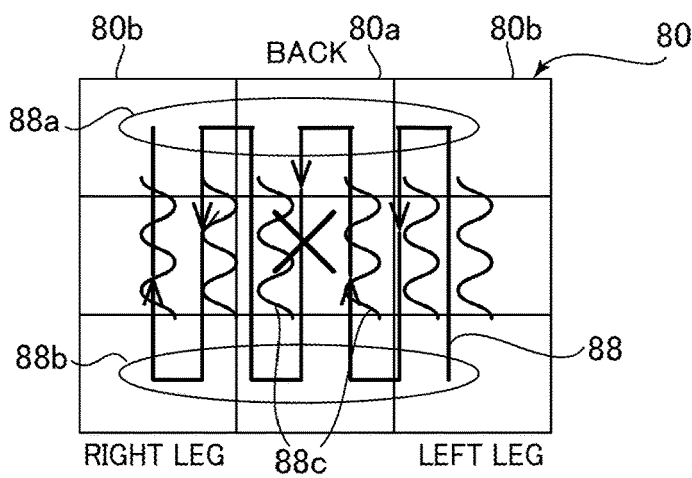
FIG. 13A is a schematic view of the cleansing region of the human body cleansed by the sanitary cleansing device.

Next, still another cleansing pattern upon operation of the wide water screen button 68*b* will be described with reference to FIGS. 13A and 13B. FIG. 13A schematically illustrates the cleansing region 80 of the human body cleansed by the sanitary cleansing device 1, and FIG. 13B is a time chart of the actuation status of each device during cleansing.

In an example of FIG. 13A, the control unit 20 actuates the nozzle drive device 12 such that the amount of splashed water per unit area is greater in a back region (a region on the back side of the private area position) of the cleansing region 80 than the amount of splashed water per unit area in a front region (a region on the front side of the private area position) of the cleansing region 80.

That is, in the example illustrated in FIG. 13A, the nozzle drive device 12 alternately repeats movement in the substantially front-to-back direction of the human body and movement in the substantially right-to-left direction of the human body, the moving distance in movement in the substantially right-to-left direction being shorter than the moving distance in movement in the substantially front-to-back direction. In this manner, the nozzle drive device 12 moves the water splash point in a movement pattern 88 for sweeping the inside of the cleansing region 80. Further, as illustrated in FIG. 13B, the nozzle drive device 12 decreases the right-to-left moving speed in a back end portion 88a of the cleansing region 80 (a portion where the moving speed of the spray port is lower in FIG. 13B) such that the amount of cleansing water sprayed while the water splash point is moving in the right-to-left direction is greater in the back end portion 88a of the cleansing region 80 than the amount of cleansing water sprayed while the water splash point is moving in the right-to-left direction in a front end portion 88b of the cleansing region 80.

Figure 13B:
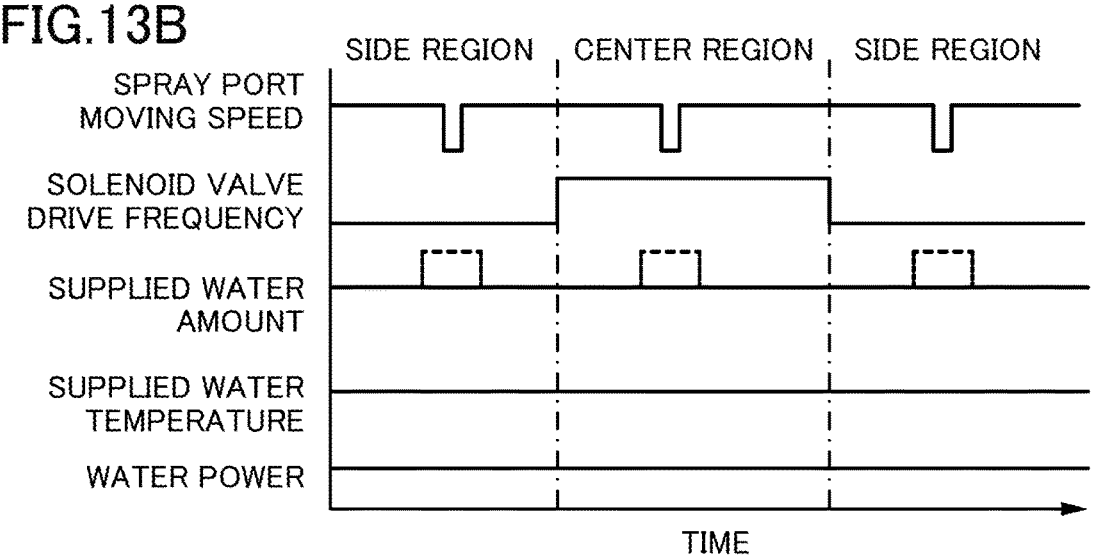
FIG. 13B is a time chart of the actuation status of each device in cleansing.

Alternatively, the water supply valve 18 (FIG. 2) is, as indicated by a dashed line in FIG. 13B, controlled such that the flow rate of cleansing water sprayed in the back region of the cleansing region 80 increases. In this manner, the amount of splashed water per unit area can be greater in the back region than in the front region. As another alternative, the amount of cleansing water sprayed to the back region of the cleansing region 80 can be greater than the amount of cleansing water sprayed to the front region in such a manner that the right-to-left moving distance in the back end portion 88a is increased to longer than that in the front end portion 88b in the movement pattern 88 or that the right-to-left moving speed in the back end portion 88a is decreased. As still another alternative, the right-to-left moving speed is decreased to lower than the front-to-back moving speed in the back end portion 88a of the cleansing region 80 with the front-to-back moving speed of the water splash point being maintained substantially constant. In this manner, the amount of cleansing water sprayed to the back region of the cleansing region 80 can be greater than the amount of cleansing water sprayed to the front region of the cleansing region 80.

Cleansing water sprayed diagonally upward from the back side to the front side of the seated human body and splashed on the back region of the cleansing region 80 forms a water screen 88c in the vicinity of the private area while flowing forward in the cleansing region 80. This allows the cleansing water as the water screen 88c to dissolve excrement adhering to the private area of the human body, leading to the state in which the excrement is easily dropped from the private area. Meanwhile, cleansing water splashed on the front side of the cleansing region 80 is dropped without forming a water screen in the vicinity of the private area. Thus, the splashed cleansing water in the back region of the cleansing region 80 exhibits a higher cleansing effect than the splashed cleansing water in the front region of the cleansing region 80. In the movement pattern illustrated in FIG. 13A, the amount of cleansing water sprayed to the back region of the cleansing region 80 is set greater than the amount of cleansing water sprayed to the front region of the cleansing region 80. Thus, a high cleansing effect can be provided with a small amount of water.

Figure 14:
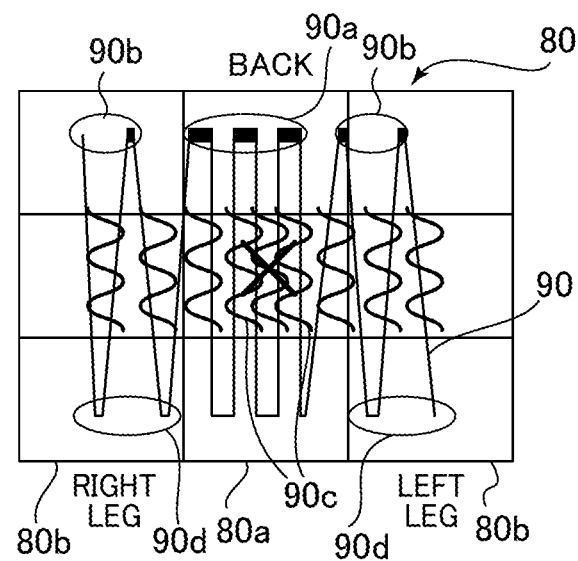
FIG. 14 is a schematic view of the cleansing region of the human body cleansed by the sanitary cleansing device.

Next, still another cleansing pattern upon operation of the wide water screen button 68b will be described with reference to FIG. 14. FIG. 14 schematically illustrates the cleansing region 80 of the human body cleansed by the sanitary cleansing device 1.

In an example illustrated in FIG. 14, the control unit 20 also actuates the nozzle drive device 12 such that the amount of splashed water per unit area is greater in the back region (the region on the back side of the private area position) of the cleansing region 80 than the amount of splashed water per unit area in the front region (the region on the front side of the private area position) of the cleansing region 80.

In the example illustrated in FIG. 14, the nozzle drive device 12 also alternately repeats movement in the substantially front-to-back direction of the human body and movement in the substantially right-to-left direction of the human body, the moving distance in movement in the substantially right-to-left direction being shorter than the moving distance in movement in the substantially front-to-back direction. In this manner, the nozzle drive device 12 moves the water splash point in a movement pattern 90 for sweeping the inside of the cleansing region 80. In the example illustrated in FIG. 14, the moving distance in the right-to-left direction is set longer in the center region 80a than in the side region 80b. That is, cleansing water splashed on a back end portion 90a of the center region 80a forms a water screen 90c in the vicinity of the private area of the human body, whereas a water screen 90c formed by cleansing water splashed on a back end portion 90b of the side region 80b is dropped without passing through the vicinity of the private area of the human body. Thus, in the example illustrated in FIG. 14, the right-to-left moving distance of the water splash point in the back end portion 90b of the center region 80a is increased so that the percentage of cleansing water forming a water screen in the vicinity of the private area pf the human body increases. On the other hand, in the side region 80b, the right-to-left moving distance of the water splash point is shorter in the back end portion 90b and a front end portion 90d, and the water splash point moves in the right-to-left direction at the same time as movement in the front-to-back direction to form a triangular or an elongated trapezoidal movement pattern. With this configuration, the water screen 90c can be efficiently formed with a small amount of cleansing water in the vicinity of the private area of the human body, leading to effective cleansing.

Moreover, in FIG. 14, the right-to-left moving distance of the water splash point is substantially the same between the back end portion and the front end portion. However, the movement pattern can be formed, in which the right-to-left moving distance is longer in the back end portion than in the front end portion.

Figure 15:
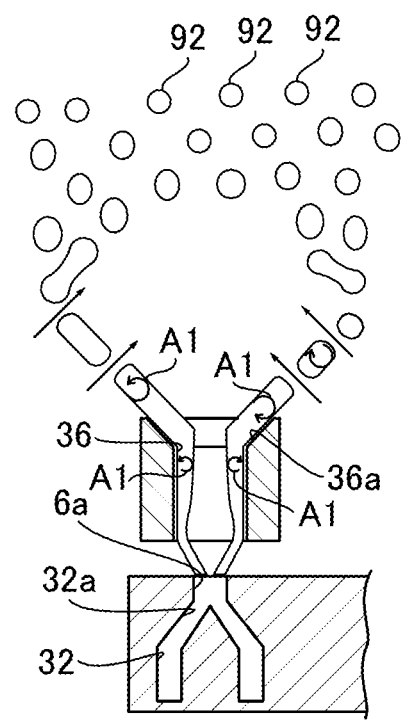
FIG. 15 is a view for describing the principle of generating mist from sprayed cleansing water.
Figure 16A:
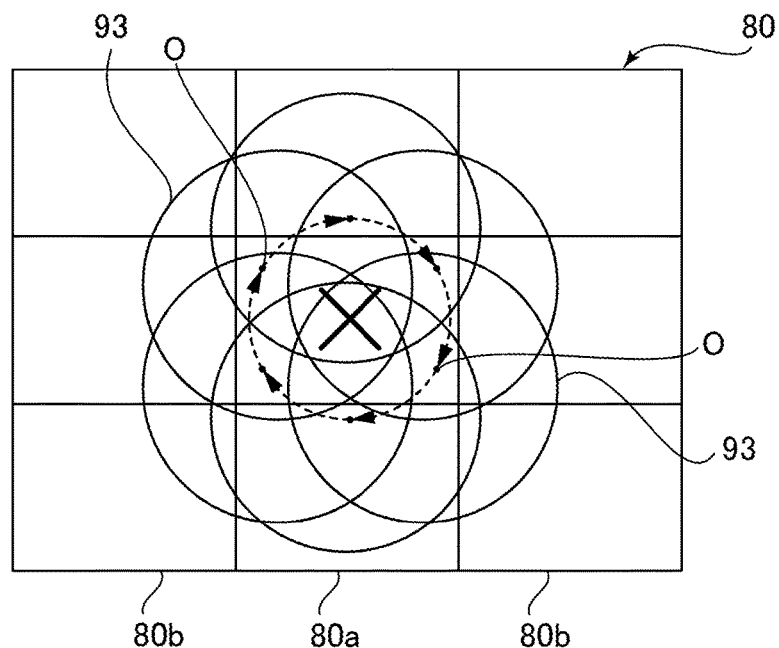
FIG. 16A is a schematic view of the cleansing region of the human body cleansed by the sanitary cleansing device.
Figure 16B:
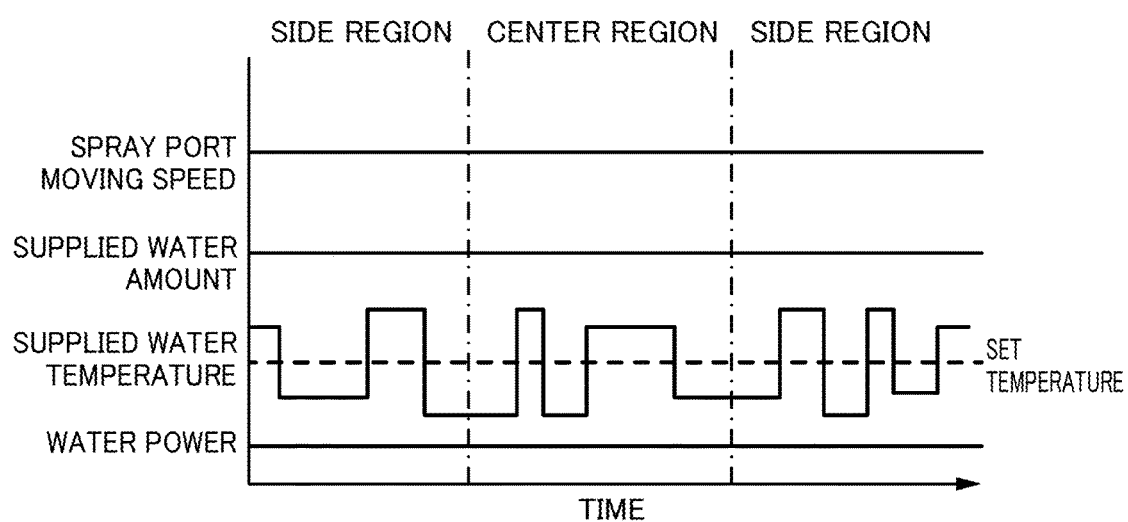
FIG. 16B is a time chart of the actuation status of each device in cleansing.

Next, a cleansing pattern upon operation of the wide mist button 68c will be described with reference to FIGS. 15, 16A, and 16B. FIG. 15 is a view for describing the principle of formation of mist from sprayed cleansing water. FIG. 16A schematically illustrates the cleansing region 80 of the human body cleansed by the sanitary cleansing device 1. FIG. 16B is a time chart of the actuation status of each device during cleansing.

When the wide mist button 68c is operated, the control unit 20 actuates the nozzle drive device 12, and switches the water path such that supplied tap water flows into the nozzle assembly 6 from the second connection portion 8b after bypassing the water mass generation device 14 and cleansing water is sprayed from the first spray port 6a through the second water supply path 7b. Accordingly, the cleansing water sprayed from the first spray port 6a turns into mist in the throat flow path 36, and then, is splashed on the human body. Note that the cleansing water is supplied to bypass the water mass generation device 14, and is supplied to the second water supply path 7b without the cleansing water being subjected to pulsation.

The cleansing water supplied to the second water supply path 7b flows into the swirl chamber 32 illustrated in FIG. 15, and then, is sprayed as a strong swirl flow from the first spray port 6a. Since the cleansing water sprayed from the first spray port 6a generates the swirl flow, such cleansing water forms a hollow conical liquid film having a hollow portion at the center. The cleansing water in a hollow conical shape flows into the throat flow path 36, and flows along an inner wall surface of the throat flow path 36 while maintaining swirling force. Then, the cleansing water flows toward an outlet of the throat flow path 36. That is, the cleansing water passing through the throat flow path 36 flows in contact with the inner wall surface of the throat flow path 36, and receives resistance due to friction force from the inner wall surface. Accordingly, the flow velocity of the cleansing water decreases toward the outlet of the throat flow path 36. Thus, as illustrated in FIG. 15, the thickness of the liquid film adhering to the inner wall surface of the throat flow path 36 increases toward the outlet of the throat flow path 36.

The flow velocity of the cleansing water flowing in the throat flow path 36 is higher in a center portion than in the vicinity of the inner wall surface as a boundary layer. Thus, a swirling current in a direction crossing the liquid film is generated in the liquid film as indicated by arrows A1 in FIG. 15. Further, an outlet end of the throat flow path 36 is provided with a tapered portion 36a having a flow path expanding toward the downstream side. The cleansing water flows along the tapered portion 36a so that the swirling current can be more easily generated in the liquid film. The cleansing water sprayed with the swirling current from the outlet of the throat flow path 36 is in a hollow conical form right after having flowed out from the throat flow path 36, but transitions to granulated water flows 92 at a position separated by a predetermined distance.

Specifically, the swirling current is generated in the direction crossing the liquid film in the hollow conical cleansing water sprayed from the outlet of the throat flow path 36, and therefore, there is a cleansing water break between adjacent swirling currents at a position away from the outlet with a certain distance. Such a break leads to fragmentation (hollow-cone fragmentation) of the hollow conical cleansing water into cleansing water mist particles, and as a result, the hollow conical cleansing water transitions to the granulated water flows 92. As described above, the swirl chamber 32 and the throat flow path 36 provided at the nozzle assembly 6 function as a hollow-cone fragmentation type mist generation device configured to form cleansing water sprayed from the first spray port 6a into particles (mist). The hollow portion of the hollow conical cleansing water has a lower pressure than an external pressure. Thus, expansion of the diameter of the hollow conical cleansing water output from the throat flow path 36 is suppressed, and the sprayed cleansing water is, as particles, splashed on the human body across the entirety of a substantially circular water splash area having a predetermined diameter. Moreover, when transitioning to the granulated water flows 92, the hollow conical cleansing water is substantially uniformly distributed across the entirety of the substantially circular area, and mist of the cleansing water splashed on the human body is distributed in a solid circular pattern.

Next, a mist cleansing mode upon operation of the wide mist button 68c (FIG. 9) will be described with reference to FIGS. 16A and 16B.

As illustrated in FIG. 16A, cleansing water mist sprayed from the first spray port 6a is, in the mist cleansing mode, splashed on a substantially circular predetermined water splash area 93 larger than that in each spot cleansing mode executed by operation of the spot button 66a. Moreover, in the mist cleansing mode, the control unit 20 substantially constantly maintains the flow rate and the water splash area 93 of the cleansing water sprayed from the first spray port 6a while actuating the nozzle drive device 12 such that the center point O of the water splash area 93 moves around the center position (a point indicated by a cross mark in FIG. 16A) of the private area of the human body along an arc-shaped track indicated by a dashed line in FIG. 16A. That is, the control unit 20 actuates the nozzle front-to-back drive motor 12a and the nozzle right-to-left drive motor 12b of the nozzle drive device 12 in synchronization with each other, and moves the first spray port 6a in two directions including the front-to-back and right-to-left directions such that the first spray port 6a of the nozzle assembly 6 moves along the arc-shaped track. At this point, the nozzle drive device 12 drives the nozzle assembly 6 such that the water splash area 93 moving along the arc-shaped track constantly includes a predetermined fixed point. Note that the present invention can be configured such that the center point of the water splash area 93 moves in an oval arc-shaped track.

For the sake of designing of the sanitary cleansing device 1, the predetermined fixed point is a point on the assumption that the center (the point indicated by the cross mark in FIG. 16A) of the private area of the human body seated on the toilet seat 4 is positioned at the point. Since the moving water splash area 93 constantly includes the position of the private area position of the human body as described above, cleansing water mist is constantly splashed on the private area of the user during mist cleansing, and a secure feeling of cleansing of the private area targeted for cleansing is provided to the user. Conversely, when the private area deviates from the water splash area 93, the user feels insecure that water is not splashed on a portion targeted for cleansing, and therefore, corrects a seating position such that water is splashed on the private area. When the water splash area 93 moves and deviates from the private area even after the correction, the user further concerns that the seating position needs to be corrected, and as a result, gets frustrated because cleansing cannot be performed with a user's feeling of calm.

Moreover, in the mist cleansing mode, the nozzle assembly 6 is preferably driven such that the water splash area 93 moves while constantly including a region including the private area position and having a predetermined area. With this configuration, cleansing water can be reliably splashed on the private area of the user.

As illustrated in FIG. 16B, the nozzle drive device 12 drives the nozzle assembly 6 such that the moving speed of the first spray port 6a is maintained constant. That is, the nozzle drive device 12 actuates the nozzle front-to-back drive motor 12a and the nozzle right-to-left drive motor 12b such that the first spray port 6a moves at a substantially constant speed on a predetermined circumference about the reference private area position. Similarly, the control unit 20 controls the water supply valve 18 such that the flow rate and power (flow velocity) of cleansing water sprayed from the first spray port 6*a* are substantially maintained constant. With this configuration, the water splash area of cleansing water sprayed from the first spray port 6*a* is substantially maintained constant. On the other hand, the control unit 20 actuates the hot-water heater 16 such that the temperature of cleansing water sprayed from the first spray port 6*a* changes. At this point, the hot-water heater 16 is actuated to more strongly heat in the mist cleansing mode than cleansing water to be sprayed in each spot cleansing mode, thereby heating the cleansing water to a higher temperature. The hot-water heater 16 changes a heating amount such that the temperature of cleansing water changes with respect to the temperature set high as described above, and the cycle and amplitude of changing the temperature of cleansing water randomly change.

In the mist cleansing mode, sprayed cleansing water is in the form of fine mist, and therefore, a stimulus provided to the user by water splashing is less than that in each spot cleansing mode. Thus, there might be user's insecure feeling that the private area is not sufficiently cleansed. For this reason, the stimulus provided to the user is increased in such a manner that the temperature of sprayed cleansing water is set high, and in this manner, a sufficient feeling of cleansing is provided to the user. Humans have properties called "acclimatization" that when the same level of stimulus is continuously provided, humans become acclimated to such a stimulus, and therefore, less feel the stimulus. For this reason, the temperature of cleansing water is randomly changed so that "acclimatization" can be reduced, and a sufficient feeling of cleansing is provided to the user.

Note that in the present embodiment, the mist cleansing mode is used for cleansing of the anus, but can be used for bidet cleansing of a private area of a female. In this case, the "private area" in description made above means the "private area of the female."

Next, each spot cleansing mode will be described with reference to FIGS. 17 and 18. Each spot cleansing mode is a cleansing mode executed when the spot button 66*a*, the refreshing spot button 66*b*, or the gentle pressure button 66*c* is operated.

First, cleansing upon operation of the spot button 66*a* will be described with reference to FIG. 17. In FIG. 17, the water splash point of cleansing water is indicated by a black circle mark, and the center position of the private area (the anus) of the human body is indicated by a cross mark.

When the spot button 66*a* is operated, the control unit 20 executes a fixed spot cleansing mode of the sport cleansing modes. In the fixed spot cleansing mode, the control unit 20 actuates the water mass generation device 14 and the nozzle drive device 12, and switches the water path such that supplied tap water flows into the nozzle assembly 6 from the third connection portion 8*c* through the water mass generation device 14 and cleansing water is sprayed from the second spray port 6*b* through the third water supply path 7*c*. Accordingly, the cleansing water sprayed from the second spray port 6*b* is, as water masses, continuously splashed on the human body.

Figure 17:
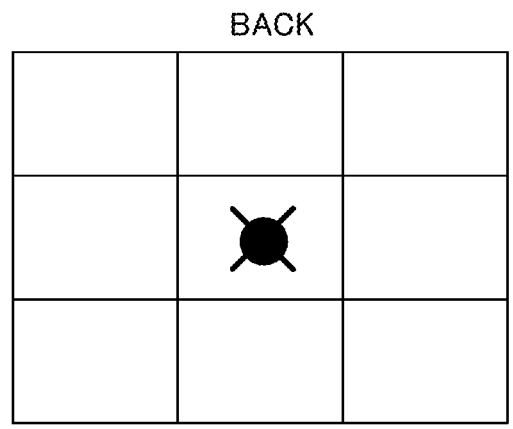
FIG. 17 is a view for describing cleansing when a spot button is operated.

Moreover, as illustrated in FIG. 17, when the spot button 66*a* is operated, the control unit 20 uses the nozzle drive device 12 to move the second spray port 6*b* to the reference private area position. Accordingly, cleansing water is sprayed with the second spray port 6*b* being stopped at the reference private area position. As described above, in the state in which the spray port is positioned at the reference private area position, the sprayed cleansing water is directed to a point of the cross mark of FIG. 17 to cleanse the center of the private area, assuming that the private area (the anus) of the human body seated on the toilet seat 4 is positioned at the point of the cross mark of FIG. 17.

On the other hand, when the gentle pressure button 66*c* is operated, the control unit 20 actuates the nozzle drive device 12, and switches the water path such that supplied tap water flows into the nozzle assembly 6 from the fourth connection portion 8*d* after bypassing the water mass generation device 14 and cleansing water is sprayed from the second spray port 6*b* through the fourth water supply path 7*d*. Thus, the cleansing water sprayed from the second spray port 6*b* draws external air by the ejector effect, and then, turns into discharged water foam containing many micro air bubbles.

Moreover, when the gentle pressure button 66*c* is operated, the control unit 20 uses the nozzle drive device 12 to move the second spray port 6*b* to the reference private area position. Accordingly, cleansing water containing foam is sprayed with the second spray port 6*b* being stopped at the reference private area position, thereby cleansing the center of the private area. The cleansing water containing foam less provides a stimulus to the human body upon water splashing, and therefore, provides the impression of gentle pressure to the user.

Next, cleansing upon operation of the refreshing spot button 66*b* will be described with reference to FIG. 18. In FIG. 18, movement of the water splash point of cleansing water is indicated by a line, and the center position of the private area of the human body is indicated by a cross mark. Moreover, illustration of a black circle mark indicating a water mass splash point is omitted.

When the refreshing spot button 66*b* is operated, the control unit 20 executes a vibration spot cleansing mode of the spot cleansing modes. In the vibration spot cleansing mode, the control unit 20 actuates the water mass generation device 14 and the nozzle drive device 12, and switches the water path such that supplied tap water flows into the nozzle assembly 6 from the third connection portion 8*c* through the water mass generation device 14 and is cleansing water sprayed from the second spray port 6*b* through the third water supply path 7*c*. Accordingly, the cleansing water sprayed from the second spray port 6*b* is, as water masses, continuously splashed on the human body.

Figure 18:
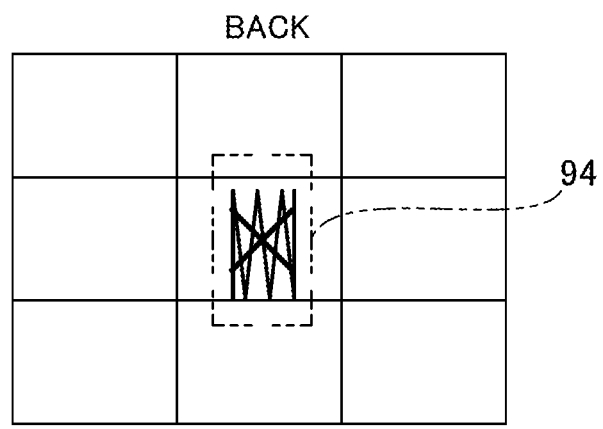
FIG. 18 is a view for describing cleansing when a refreshing spot button is operated.

Moreover, as illustrated in FIG. 18, when the refreshing spot button 66*b* is operated, the control unit 20 actuates the nozzle drive device 12 such that the second spray port 6*b* reciprocates in the vicinity of the reference private area position. Accordingly, in the vibration spot cleansing mode, the water splash point reciprocates in a stroke shorter than that in the port-movable cleansing mode. Specifically, in the vibration spot cleansing mode, the second spray port 6*b* reciprocates in the front-to-back direction in a short stroke while repeating a zigzag movement pattern for moving the second spray port 6*b* in the right-to-left direction little by little. The cleansing region (the water splash area) upon operation of the wide water screen button 68*b* has about 30 mm in the front-to-back direction of the seated human body and about 20 mm in the right-to-left direction of the seated human body. On the other hand, a spot cleansing region 94 to be cleansed upon operation of the refreshing spot button 66*b* has about 2 to 3 mm in the front-to-back direction of the seated human body and about 2 to 3 mm in the right-to-left direction of the seated human body. As described above, the movement stroke of the water splash point is, not only in the front-to-back direction but also in the right-to-left direction, set shorter in the vibration spot cleansing mode than in the port-movable cleansing mode.

In the present embodiment, the control unit 20 actuates the nozzle drive device 12 such that the water splash point sweeps in the spot cleansing region in the movement pattern for repeatedly reciprocating the water splash point in the substantially front-to-back direction of the human body while moving the water splash point in the substantially right-to-left direction of the human body. Moreover, in the present embodiment, the spot cleansing region is set as a substantially square region formed about the water splash point in the fixed spot cleansing mode. Alternatively, the spot cleansing region can be set as a substantially rectangular region elongated in the front-to-back direction, the rectangular region being formed about the water splash point in the fixed spot cleansing mode.

Note that the vibration spot cleansing mode can be set such that the water splash point reciprocates only in the front-to-back direction.

The fixed spot cleansing mode executed by operation of the spot button 66a is a cleansing mode for spraying cleansing water to the private area with the spray port being stopped at the reference private area position. Since the water splash point does not move in the fixed spot cleansing mode, part of splashed cleansing water might flow back from the anus to the rectum due to water splashing on the center position of the private area for a long period of time, leading to a user's additional urge to defecate or a user's feeling of incomplete evacuation. In particular, such a phenomenon tends to be easily caused when the user relaxes the anal sphincter after defecation, and some users might feel extremely uncomfortable about this phenomenon. On the other hand, in the vibration spot cleansing mode executed by operation of the refreshing spot button 66b, cleansing water is sprayed while the spray port is reciprocating in a minute stroke in the vicinity of the reference private area position, and the water splash point constantly moves in the vicinity of the center position of the private area. In such a cleansing state, a cleansing feeling which is almost indistinguishable from that in the fixed spot cleansing mode is provided to the user. Thus, a sufficient feeling of cleansing of the private area can be provided to the user, and a cleansing water backflow to the rectum can be reduced. As a result, an uncomfortable incomplete evacuation feeling is felt less by the user.

Next, a transition mode executed upon switching of the cleansing mode will be described with reference to FIGS. 19A and 19B.

Figure 19A:
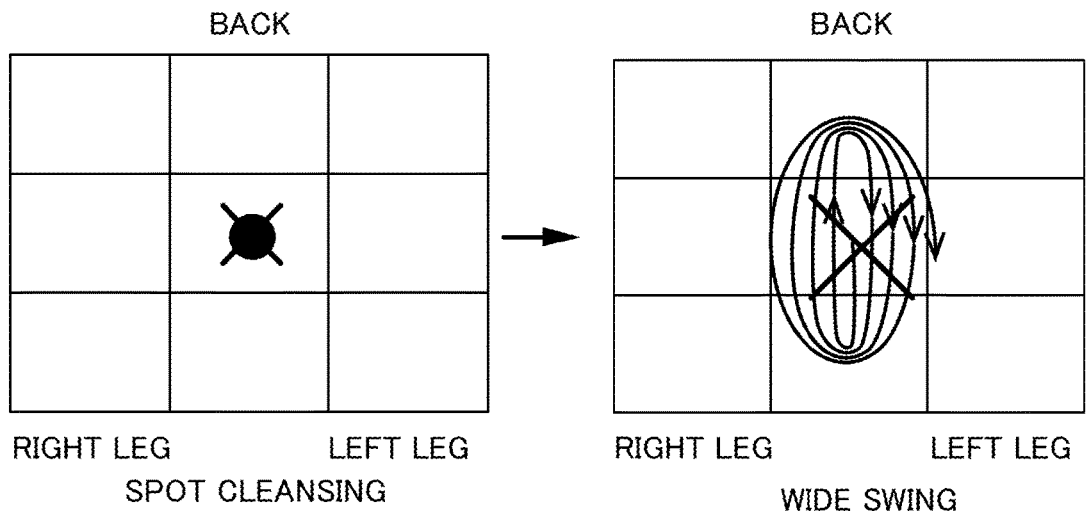
FIG. 19A is a view of a water splash point in transition from a fixed spot cleansing mode to a wide turning cleansing mode.

FIG. 19A is a view of an example of the water splash point when the fixed spot cleansing mode transitions to the wide turning cleansing mode as one of the spot-movable cleansing modes. FIG. 19B is a time chart of the actuation status of each device in the transition mode.

As illustrated in FIG. 19A, when the wide turning button 68d is operated during execution of the fixed spot cleansing mode, the water splash point does not promptly transition to the oval track in the wide turning cleansing mode (FIG. 10B), but gradually expands, in the right-to-left direction, an oval track elongated in the front-to-back direction while moving in a spiral pattern to eventually reach the oval track in the wide turning cleansing mode. In the present specification, a cleansing mode included in the port-movable cleansing modes and made for also moving the water splash point in the substantially right-to-left direction of the human body is referred to as a "wide movement cleansing mode." That is, after the wide turning cleansing mode as the wide movement cleansing mode has started, the control unit 20 actuates the nozzle drive device 12 such that the water splash area is gradually expanded in the right-to-left direction.

Figure 19B:
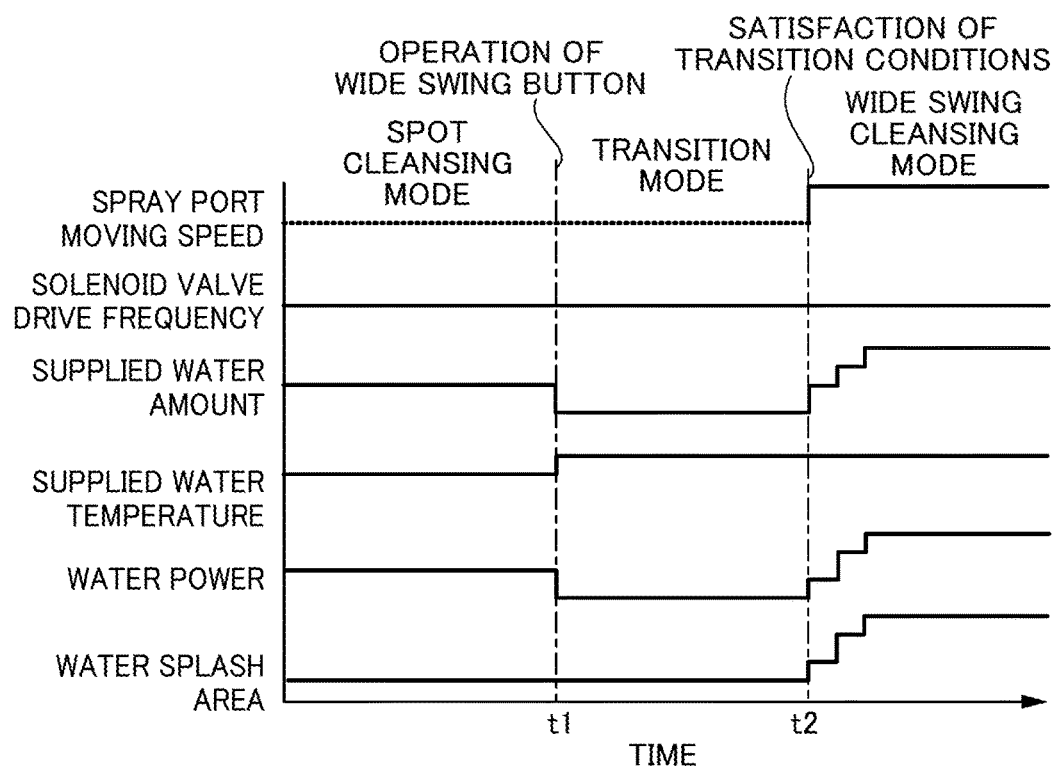
FIG. 19B is a time chart of the actuation status of each device in a transition mode.

FIG. 19B is the time chart of the actuation status of each device upon transition from the fixed spot cleansing mode to the wide turning cleansing mode.

When the wide turning button 68d is operated at a time point t1 of FIG. 19B, the control unit 20 sends the control signal to the hot-water heater 16, thereby increasing the temperature of sprayed cleansing water. Moreover, the control unit 20 sends the control signal to the water supply valve 18, thereby decreasing the degree of opening of the water supply valve 18 to decrease the power (the flow velocity) of the sprayed cleansing water. As described above, when the wide movement cleansing mode (the wide turning cleansing mode) begins, the flow velocity of cleansing water sprayed from the second spray port 6b decreased to lower than the flow velocity of cleansing water in the fixed spot cleansing mode. The control unit 20 maintains this state until predetermined transition conditions for the wide turning cleansing mode are satisfied. In the present embodiment, a change in the detection signal of the seating sensor 22 (FIG. 2) (a change in a seating state) after the operation of switching the cleansing mode by the user and a lapse of a predetermined period of time after switching operation are set as the transition conditions.

When the seated user changes the seating position on the toilet seat 4, the seating sensor 22 responds to such a change, and the detection signal changes. When such a change in the detection signal is detected, the control unit 20 determines that the transition conditions are satisfied, and then, transitions to the wide turning cleansing mode. Moreover, when four seconds have elapsed after operation of the wide turning button 68d, the control unit 20 also determines that the transition conditions are satisfied, and then, transitions to the wide turning cleansing mode to start movement of the water splash point. That is, after the user has operated the wide turning button 68d, when the seating position is fine-tuned such that cleansing water is splashed on a proper position, such a state is regarded as being prepared for starting the changed cleansing mode. Thus, even when the cleansing mode is changed, no feeling of discomfort is provided to the user. Alternatively, when four seconds have elapsed after operation of the wide turning button 68d, such a state is also regarded as being prepared for staring the changed cleansing mode. Thus, even when the cleansing mode is changed, no feeling of discomfort is provided to the user.

When the transition conditions are satisfied at a time point t2 of FIG. 19B, the control unit 20 sends the signal to the nozzle drive device 12, thereby starting driving of the nozzle assembly 6. At this point, the second spray port 6b of the nozzle assembly 6 gradually expands, starting from the reference private area point, a movement area in the right-to-left direction of the human body, and therefore, the water splash area is also gradually expanded in the right-to-left direction as illustrated in FIG. 19A. Further, the control unit 20 sends the control signal to the water supply valve 18, thereby gradually increasing the degree of opening of the water supply valve 18. With this configuration, the water splash area is expanded while the power (the flow velocity) of cleansing water sprayed from the second spray port 6b increases. Note that in the present embodiment, the flow velocity of cleansing water sprayed from the spray port is changed by a change in the degree of opening of the water supply valve 18, and therefore, the water supply valve 18 functions as a flow velocity changing device. When the sanitary cleansing device includes the pump configured to pressurize cleansing water, such a pump can be utilized as the flow velocity changing device.

As described above, since the wide movement cleansing mode starts from the reference private area position as described above, the user can easily recognize a position about which port-movable cleansing starts. With this configuration, the user can fine-tune the seating position on the toilet seat 4, or can use the water splash position button 74c to correct the reference private area position to a proper position. Moreover, since the water splash area is gradually expanded in the right-to-left direction, the following situation can be prevented: due to direct cleansing water splashing on a position apart from the private area, the user misunderstands that the seating position is displaced, or uncomfortably feels that a position not targeted for cleansing gets wet. Further, when the water splash area is expanded, the amount of water splashed on the center of the private area of the human body decreases. However, a stimulus provided to the user is increased not only by expansion of the water splash area, but also by an increase in the temperature and flow velocity of cleansing water. Thus, an insufficient feeling of cleansing due to a decrease in the splashed water amount can be alleviated.

In the example illustrated in FIGS. 19A and 19B, the cleansing mode is switched from the fixed spot cleansing mode to the wide movement cleansing mode (the wide turning cleansing mode). However, even when the cleansing mode is switched from a first wide movement cleansing mode to a second wide movement cleansing mode, e.g., from the wide turning cleansing mode to a wide water screen cleansing mode, a similar transition mode is executed. That is, when the wide water screen button 68b is operated during execution of the wide turning cleansing mode, the transition mode is executed such that the nozzle drive device 12 moves the second spray port 6b to the reference private area position to execute the fixed spot cleansing mode for a predetermined period of time. When the above-described transition conditions are satisfied in this state, the nozzle drive device 12 starts the wide movement cleansing mode, thereby starting movement of the water splash point. Moreover, in the case of starting the wide water screen cleansing mode, the water splash area is expanded in the right-to-left direction every time the pattern for moving the water splash point is repeated, the water splash area eventually reaches a predetermined movement pattern (e.g., FIG. 10C). Moreover, in the present embodiment, two flow velocity levels of a high flow velocity and a low flow velocity are set as the flow velocity of cleansing water sprayed from the spray port in the fixed spot cleansing mode. In the fixed spot cleansing mode executed by operation of the "spot button 66a," cleansing water is sprayed at the high flow velocity. On the other hand, in the transition mode, cleansing water is sprayed at the low flow velocity in the fixed spot cleansing mode executed between the first wide movement cleansing mode and the second wide movement cleansing mode.

In the example of FIGS. 19A and 19B, the flow velocity of sprayed cleansing water increases with expansion of the water splash area, and is maintained constant after completion of transition of the cleansing mode. However, such a flow velocity can be changed in a single movement pattern. For example, in the case where the position of the spray port is apart from the reference private area position in the right-to-left direction of the human body, cleansing water may be sprayed at a higher flow velocity as compared to the case where the position of the spray port is close to the reference private area position in the right-to-left direction of the human body. With this configuration, a longer distance between the water splash point and the private area in the right-to-left direction results in a higher water power, and therefore, a sufficient feeling of cleansing of the less-sensitive side region can be provided.

Further, even when the cleansing mode is switched to the mist cleansing mode (FIGS. 16A and 16B), the mist cleansing mode is preferably started after execution of the transition mode. In addition, since the second spray port 6b moves in the right-to-left direction in the vibration spot cleansing mode (FIG. 18), the vibration spot cleansing mode can be regarded as one of the wide movement cleansing modes. However, the vibration spot cleansing mode is a cleansing mode for reciprocating the water splash point in a stroke shorter than that in other wide movement cleansing modes. Thus, even when the vibration spot cleansing mode is directly started without performing the fixed spot cleansing mode after movement of the spray port to the reference private area position, a strong feeling of discomfort is not provided to the user. Consequently, when the cleansing mode transitions from another wide movement cleansing mode to the vibration spot cleansing mode, the transition mode performed through the fixed spot cleansing mode is not necessarily executed.

Next, each defecation promotion cleansing mode will be described with reference to FIGS. 20 to 24.

First, a massage cleansing mode included in the defecation promotion cleansing modes and executed by operation of the massage button 70b will be described with reference to FIGS. 20 to 22. The massage cleansing mode is a cleansing mode mainly directed at defecation promotion and executed by operation of the massage button 70b as another operation section different from the spot button 66a etc. directed at cleansing of the private area after defecation.

In the massage cleansing mode, the control unit 20 actuates the water mass generation device 14 and the nozzle drive device 12, and switches the water path such that supplied tap water flows into the nozzle assembly 6 from the third connection portion 8c through the water mass generation device 14 and is cleansing water sprayed from the second spray port 6b through the third water supply path 7c. Accordingly, the cleansing water sprayed from the second spray port 6b is, as water masses, continuously splashed on the body.

In FIG. 20, the center position of the private area (the anus) of the human body seated on the toilet seat 4 is indicated by a cross mark, and the movement path of the water splash point of cleansing water is indicated by arrows. As illustrated in FIG. 20, when the massage button 70b is operated, a turning movement pattern for turning the water splash point clockwise two times at the periphery of the private area position of the human body is first executed. Then, a front-to-back movement pattern for moving the water splash point through the private area position of the human body in the substantially front-to-back direction of the human body is executed. Further, a turning movement pattern for turning the water splash point counterclockwise two times at the periphery of the private area position of the human body is executed, and then, the front-to-back movement pattern is executed again. In the massage cleansing mode, a massage movement cycle including, as a single cycle, the clockwise turning movement pattern, the front-to-back movement pattern, the counterclockwise turning movement pattern, and the front-to-back movement pattern is repeatedly executed until the stop button 72a is operated.

Note that the phrasing of turning the water splash point at the periphery of the private area position of the human body means that the spray port moves such that the water splash point moves at the periphery of a predetermined position, assuming that the private area (the anus) of the seated human body is positioned at the predetermined position in designing of the sanitary cleansing device 1. As described above, when cleansing water is sprayed with the spray port being positioned at the reference private area position, the cleansing water is splashed on the position assumed that the private area of the human body is positioned. Thus, the spray port moves about the reference private area position so that the water splash point can turning at the periphery of the private area position of the human body.

Moreover, in the present embodiment, the period for performing the turning movement pattern is set longer than the period for performing the front-to-back movement pattern, and the amount of sprayed cleansing water is greater in the turning movement pattern than in the front-to-back movement pattern. Further, the front-to-back movement pattern included in the massage movement cycle is a single cycle of straight reciprocation for moving the water splash point from the front side to the back side of the human body after movement of the water splash point from the back side to the front side of the human body. The front-to-back movement pattern is constantly set as the same movement pattern.

As described above, in the massage cleansing mode, cleansing is performed in the turning movement pattern such that the anal sphincter around the private area of the human body is massaged. Thus, a defecation promotion effect for the user can be expected. That is, the massage cleansing mode can provide, to the user, a comfortable feeling because a free surface substance such as fluid can properly contact, with a proper intensity, a private area portion having a thin skin of an upper portion of a sensory system and covered with a mucous membrane. Moreover, the front-to-back movement pattern for moving the water splash point through the private area of the human body is executed during the turning movement pattern. Thus, the user can recognize that the water splash position is not displaced, leading to a user's secure feeling. Further, since clockwise turning and counterclockwise turning are executed as the turning movement pattern, acclimatization of a stimulus to the anal sphincter can be prevented, and a massage effect can be enhanced.

Figure 21B:
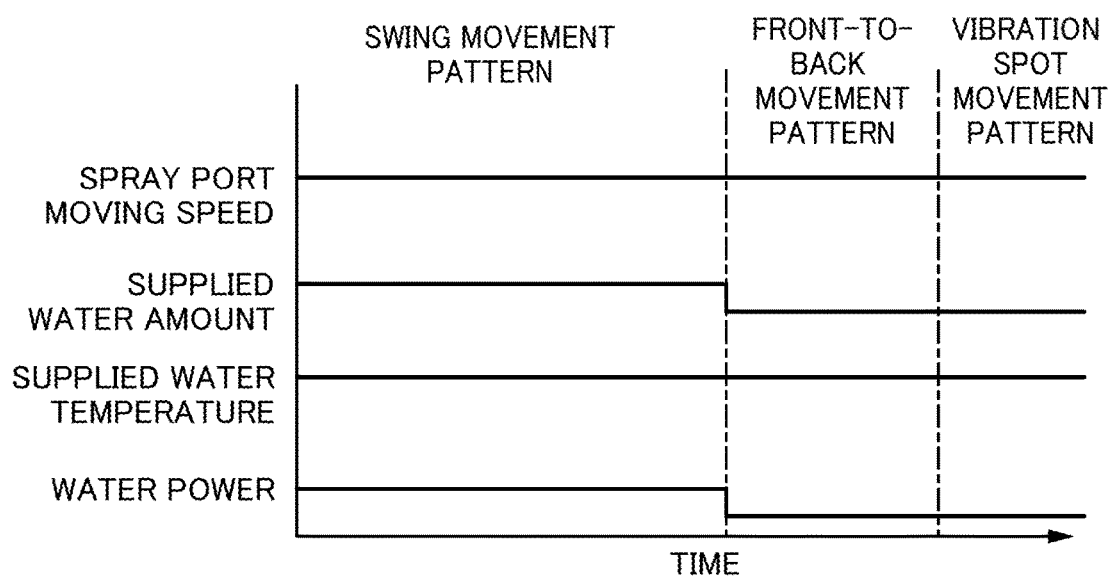
FIG. 21B is a time chart of the actuation status of each device in the massage cleansing cycle.

Next, another massage cleansing cycle upon operation of the massage button 70b will be described with reference to FIGS. 21A and 21B. FIG. 21A illustrates the massage cleansing cycle executed by the sanitary cleansing device 1. FIG. 21B is a time chart of the actuation status of each device in the massage cleansing cycle. Note that in the sanitary cleansing device 1 of the present embodiment, the detailed setting screen (not shown) is displayed by operation of the individual setting button 74d (FIG. 9) on the touch panel 10a. On such a screen, various massage cleansing cycles can be selected as the "massage cleansing mode."

The massage cleansing cycle illustrated in FIG. 21A is a cleansing cycle in which a clockwise turning movement pattern, a front-to-back movement pattern, a vibration spot movement pattern, a counterclockwise turning movement pattern, and a front-to-back movement pattern are executed in this order. Each of the turning movement patterns and the front-to-back movement patterns is the same as a corresponding one of the massage cleansing cycle illustrated in FIG. 20. As in cleansing in the vibration spot cleansing mode executed upon operation of the refreshing spot button 66b, the second spray port 6b reciprocates in a minute stroke in the vicinity of the reference private area position in the vibration spot movement pattern. Note that in the vibration spot movement pattern, the water splash point may reciprocate only in the front-to-back direction in a stroke shorter than that in the front-to-back movement pattern, or may reciprocate in the front-to-back direction in a stroke shorter than that in the front-to-back movement pattern while laterally moving in the right-to-left direction.

Further, as illustrated in FIG. 21B, the moving speed of the second spray port 6b is, in the massage cleansing cycle, maintained constant in execution of the turning movement pattern, the front-to-back movement pattern, and the vibration spot movement pattern. Moreover, the temperature of cleansing water sprayed from the spray port is also maintained constant. On the other hand, the power (the flow velocity) of cleansing water sprayed from the second spray port 6b is set smaller in execution of the front-to-back movement pattern and the vibration spot movement pattern than in execution of the turning movement pattern. That is, the control unit 20 sends the control signal to the water supply valve 18, thereby setting a lower flow velocity in execution of the front-to-back movement pattern and the vibration spot movement pattern.

According to the massage cleansing cycle illustrated in FIGS. 21A and 21B, such a cycle includes the vibration spot movement pattern for reciprocating the water splash point in a shorter stroke. Thus, a stronger stimulus can be provided to the center of the private area, and the defecation promotion effect can be further provided. Moreover, according to the massage cleansing cycle, the power of cleansing water in execution of the front-to-back movement pattern and the vibration spot movement pattern is set lower than that in execution of the turning movement pattern. Thus, more cleansing water can be applied for a massage of the anal sphincter, and therefore, a higher defecation promotion effect can be provided with less cleansing water.

Next, still another massage cleansing cycle upon operation of the massage button 70b will be described with reference to FIG. 22.

Figure 22:
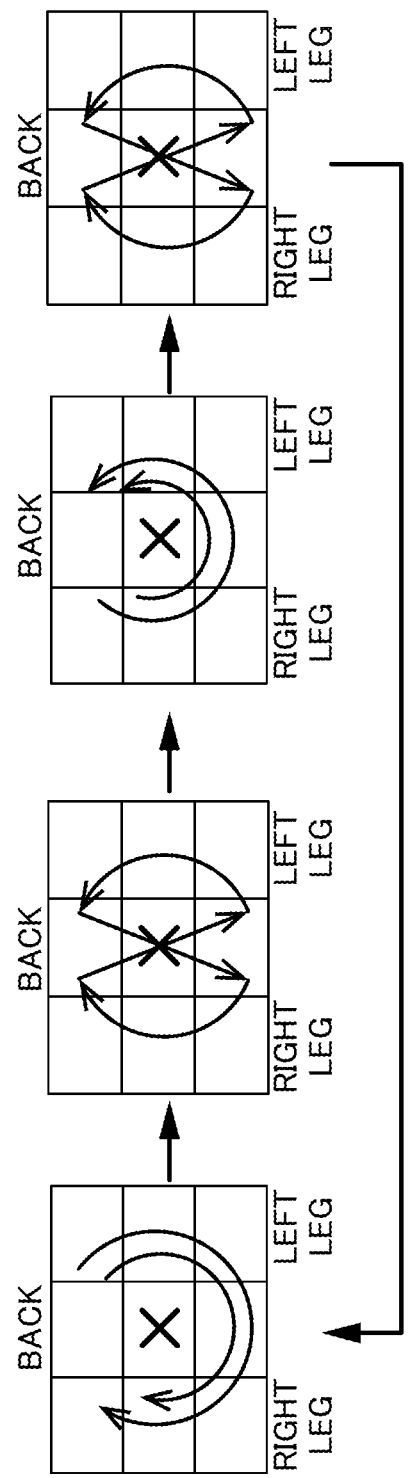
FIG. 22 is a view for describing the massage cleansing cycle executed by operation of the massage button.

The massage cleansing cycle illustrated in FIG. 22 is a cleansing cycle in which a clockwise turning movement pattern, a figure-8-shaped front-to-back movement pattern, a counterclockwise turning movement pattern, and a figure-8-shaped front-to-back movement pattern are executed in this order. Each turning movement pattern is the same as a corresponding one of the massage cleansing cycle illustrated in FIG. 20.

Moreover, in the massage cleansing cycle illustrated in FIG. 22, the water splash point moves in a figure-8 shape in the front-to-back movement pattern. In this movement pattern, the water splash point first moves through the private area of the human body in the substantially front-to-back direction in one direction from the back side to the front side of the human body. Subsequently, the water splash point turns, in the clockwise direction, halfway around the private area of the human body along an arc-shaped track from the front side to the back side, and then, moves through the private area of the human body in the substantially front-to-back direction from the back side to the front side. Eventually, the water splash point turns, in the counterclockwise direction, halfway around the private area of the human body along an arc-shaped track from the front side to the back side. As a result, the water splash point moves along a horizontally-oriented figure-8-shaped track passing two times through the private area of the human body in the substantially front-to-back direction.

According to the massage cleansing cycle illustrated in FIG. 22, the front-to-back movement pattern executed between the turning movement patterns also includes half-turning movement. Thus, the interval of interrupting the anal sphincter massage is short, and therefore, defecation can be more effectively promoted.

Next, a defecation promotion spot cleansing mode included in the defecation promotion cleansing modes and executed by operation of the defecation promotion spot button 70*a* will be described with reference to FIGS. 23 and 24. The defecation promotion spot cleansing mode is a cleansing mode mainly directed at defecation promotion and executed by operation of the defecation promotion spot button 70*a* as another operation section different from the spot button 66*a* etc. directed at cleansing of the private area after defecation.

In the defecation promotion spot cleansing mode, the control unit 20 actuates the water mass generation device 14 and the nozzle drive device 12, and switches the water path such that supplied tap water flows into the nozzle assembly 6 from the third connection portion 8*c* through the water mass generation device 14 and cleansing water is sprayed from the second spray port 6*b* through the third water supply path 7*c*. Accordingly, the cleansing water sprayed from the second spray port 6*b* is, as water masses, continuously splashed on the human body.

Figure 23A:
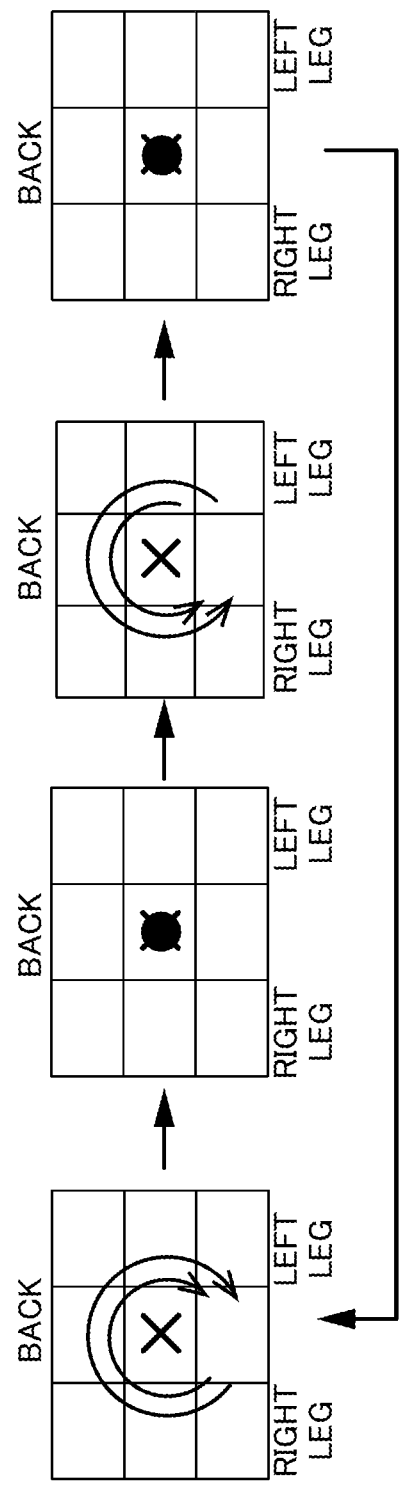
FIG. 23A is a view for describing a defecation promotion cycle executed by operation of a defecation promotion spot button.

In FIG. 23A, the center position of the private area (the anus) of the human body seated on the toilet seat 4 is indicated by a cross mark, and the movement path of the water splash point of cleansing water is indicated by arrows. As illustrated in FIG. 23A, when the defecation promotion spot button 70*a* is operated, a turning movement pattern for turning the water splash point clockwise at the periphery of the private area of the human body is first executed. Then, fixed spot cleansing is executed for a predetermined period of time such that cleansing water is sprayed with the second spray port 6*b* being stopped at the reference private area position. Further, after execution of a turning movement pattern for turning the water splash point counterclockwise at the periphery of the private area of the human body, fixed spot cleansing is executed again for a predetermined period of time. In this manner, a single defecation promotion cycle is completed. Such a defecation promotion cycle is repeatedly executed until the stop button 72*a* is operated.

In the single defecation promotion cycle, the period for performing the turning movement pattern is set longer than the period for performing fixed spot cleansing, and the turning movement pattern is set such that sprayed cleansing water is not directly splashed on the center point (the anus position) of the private area of the human body. Moreover, the defecation promotion cycle is set to include a different turning movement pattern every execution of the defecation promotion cycle. That is, the number of turns or the angle of turning in each turning movement pattern is randomly set.

Figure 23B:
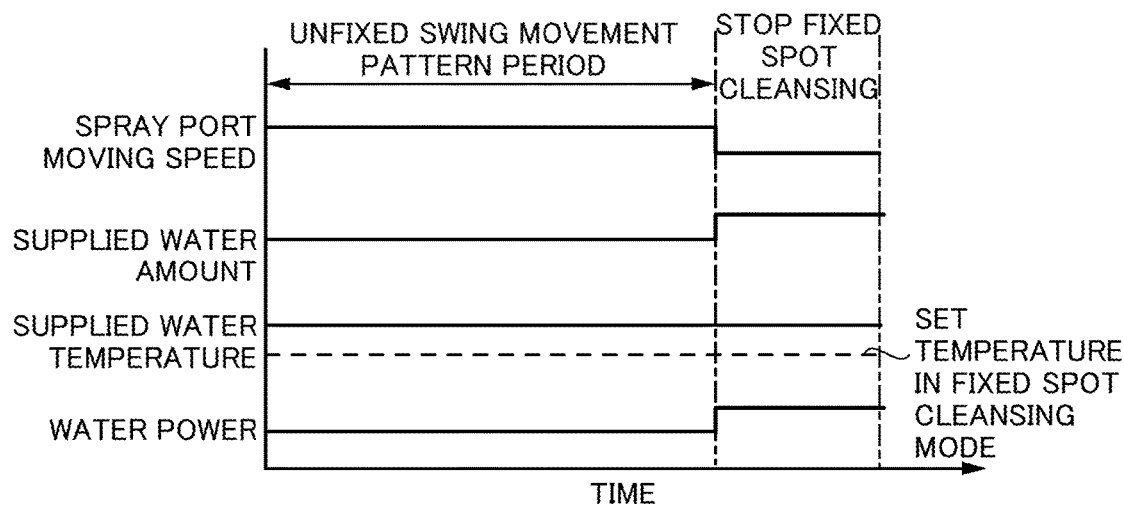
FIG. 23B is a time chart of the actuation status of each device in the defecation promotion cycle.

Moreover, in the defecation promotion cycle, the moving speed of the second spray port 6*b* is, as illustrated in FIG. 23B, maintained constant during the period for executing the turning movement pattern, and the second spray port 6*b* is stopped at the reference private area position after the turning movement pattern has transitioned to fixed spot cleansing. Note that the number of turns or the angle of turning of the water splash point in the turning movement pattern is randomly set every execution, and therefore, the period for executing the turning movement pattern is an unfixed period. Further, the temperature of sprayed cleansing water is maintained constant across all periods of the defecation promotion cycle, but set higher than the set temperature of cleansing water in the fixed spot cleansing mode executed by operation of the spot button 66*a*. That is, when the defecation promotion spot cleansing mode begins, the control unit 20 sends the control signal to the hot-water heater 16, thereby increasing the temperature of sprayed cleansing water. Moreover, when the turning movement pattern transitions to fixed spot cleansing, the control unit 20 sends the control signal to the water supply valve 18, thereby increasing the flow velocity (the power) of sprayed cleansing water.

Figure 24:
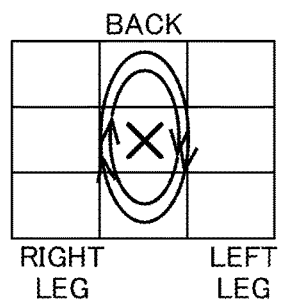
FIG. 24 is a view of a variation of a turning movement pattern in the defecation promotion cycle.

Further, as illustrated in FIG. 24, the turning movement pattern in the defecation promotion cycle can be, as a variation, set such that the water splash point moves along an oval track elongated in the front-to-back direction of the human body. Such an oval track matches the form of the anal sphincter of the human body, and a stronger massage effect can be provided. Note that the clockwise oval track is illustrated in FIG. 24, but the counterclockwise turning movement pattern can be also along an oval track, needless to say. Moreover, the turning movement pattern in the above-described massage cleansing cycle (FIGS. 20 to 22) can be along an oval track.

The defecation promotion spot cleansing mode is directed at a stronger defecation promotion effect. As described above, in the fixed spot cleansing mode, when cleansing water is splashed on the center of the private area (the anus) of the human body, the cleansing water might flow back from the anus to enter the rectum, leading to a user's strong urge to defecate. However, when the user tenses the anal sphincter to tighten the anus, much cleansing water does not enter the anus, and therefore, the defecation promotion effect cannot be provided. In the defecation promotion spot cleansing mode, the turning movement pattern is first executed with high-temperature cleansing water. In this manner, the anal sphincter is massaged such that the user relaxes the anal sphincter. After the turning movement pattern, the water power is increased, and fixed spot cleansing is executed. Thus, cleansing water is splashed on the center of the private area of the human body with the anal sphincter being relaxed, leading to easy entrance of the cleansing water into the rectum and a stronger defecation promotion effect. In addition, the turning movement pattern is executed for a different period (a different turning angle) every execution of the defecation promotion cycle. Thus, the user cannot predict the time of initiation of fixed spot cleansing, and it is difficult to purposely tense the anal sphincter at the start of fixed spot cleansing. This allows cleansing water to effectively enter the rectum, leading to a strong defecation promotion effect.

Next, the stop sequence will be described with reference to FIGS. 25 to 27.

The stop sequence is a cleansing mode sequence executed by operation of the finishing stop button 72*b* (FIG. 9), and is for automatically stopping spraying of cleansing water after execution of a series of preset cleansing mode. In the sanitary cleansing device 1 of the present embodiment, the stop button 72*a* as an operation section for promptly stopping spraying of cleansing water without executing the stop sequence is provided in addition to the finishing stop button 72*b* as an operation section for executing the stop sequence.

According to research made by the applicant, it has been found that the user of the sanitary cleansing device does not always use the sanitary cleansing device only for the purpose of cleansing the dirty private area due to defecation, but uses the sanitary cleansing device for the purposes of, e.g., promoting defecation and obtaining a feeling of relaxation and satisfaction after defecation. For these reasons, the user might continuously use the sanitary cleansing device after sufficient cleansing of the private area after defecation, and stop using the sanitary cleansing device after the user has obtained a certain feeling of satisfaction. The stop sequence is directed at use for providing such a certain feeling of satisfaction to the user.

Figure 25:
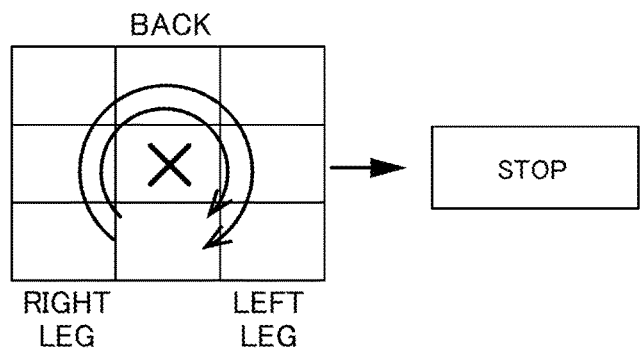
FIG. 25 is a view for describing an example of a stop sequence executed by operation of a finishing stop button.

FIG. 25 illustrates an example of the stop sequence. The center position of the private area (the anus) of the human body seated on the toilet seat 4 is indicated by a cross mark, and the movement path of the water splash point of cleansing water is indicated by arrows. In this stop sequence, after the wide turning cleansing mode (FIG. 10B) as the port-movable cleansing mode for turning the water splash point clockwise at the periphery of the private area of the human body has been executed for a predetermined period of time, spraying of cleansing water is automatically stopped. After the private area has been sufficiently cleansed using, e.g., the fixed spot cleansing mode, the user operates the finishing stop button 72b to stop the finishing turning movement pattern performed for the predetermined period of time. In this manner, a toilet activity is completed. This allows completion of the toilet activity after the anal sphincter congested due to defecation has been sufficiently massaged.

Figure 26:
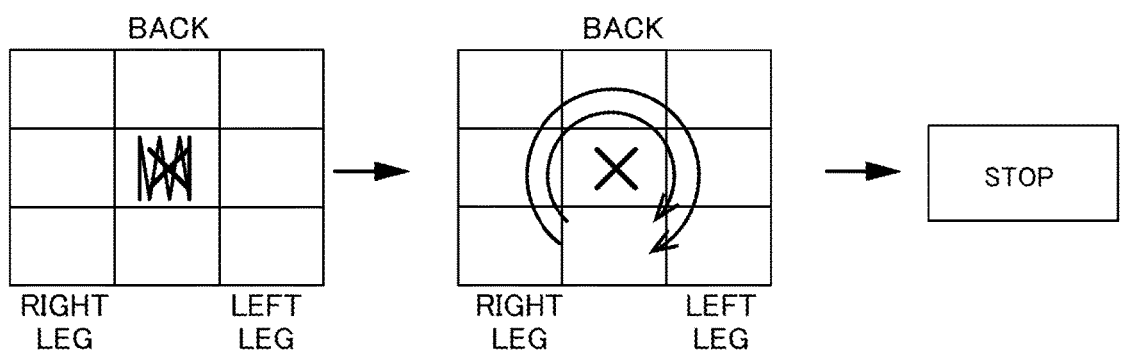
FIG. 26 is a view for describing another example of the stop sequence executed by operation of the finishing stop button.

FIG. 26 is another example of the stop sequence. Note that in the sanitary cleansing device 1 of the present embodiment, the detailed setting screen (not shown) is displayed by operation of the individual setting button 74d (FIG. 9) on the touch panel 10a, and the stop sequence can be set according to user's preference on such a screen.

In the example illustrated in FIG. 26, after the vibration spot cleansing mode has been executed for a predetermined period of time, the turning movement pattern is executed for a predetermined period of time, and then, spraying of cleansing water is automatically stopped. As described above, since the vibration spot cleansing mode is the cleansing mode for reciprocating the water splash point in the stroke shorter than that in the port-movable cleansing mode, a cleansing water backflow to the rectum is less caused, and a feeling of incomplete evacuation is less felt by the user. Thus, the vibration spot cleansing mode is suitable for execution in the stop sequence. That is, in the stop sequence, the cleansing mode set such that the area where cleansing water is splashed on the human body is larger than that in the fixed spot cleansing mode is preferably executed. Thus, the cleansing mode for moving the water splash point is preferably executed. Note that in the vibration spot cleansing mode, the water splash point may move only in the front-to-back direction without movement of the water splash point in the right-to-left direction.

As described above, it is preferred that the cleansing mode included in the stop sequence is not the cleansing mode for providing a strong stimulus to the rectum by cleansing water as in the fixed spot cleansing mode, but the cleansing mode for less providing a stimulus to the rectum. Thus, the present invention can be configured such that the fixed spot cleansing mode cannot be set as the stop sequence. Alternatively, the massage cleansing mode (FIG. 20) including the turning movement pattern for turning the water splash point of cleansing water sprayed from the spray port at the periphery of the private area position of the seated human body and the front-to-back movement pattern for moving the water splash point through the private area position in the front-to-back direction of the human body can be set as the stop sequence. Further, the stop sequence can be set to include the port-movable cleansing mode for moving the water splash point in the substantially front-to-back direction of the seated human body and the vibration spot cleansing mode for reciprocating the water splash point in the front-to-back direction in a stroke with a shorter moving distance than that in the port-movable cleansing mode while moving the water splash point in the substantially right-to-left direction of the human body.

As described above, various types of cleansing modes executed in the stop sequence can be selected according to the user's preference. In the sanitary cleansing device 1 of the present embodiment, cleansing mode parameters such as the temperature of sprayed cleansing water, the flow velocity of sprayed cleansing water, and a time at which the stop sequence is executed can be set in addition to the type of cleansing mode on the touch panel 10a of the remote controller 10. Thus, the touch panel 10a functions as a cleansing mode setting device.

In addition to the cleansing mode parameters in the stop sequence, as described above, parameters such as the temperature and flow velocity of cleansing water can be, on the touch panel 10a, set for each cleansing mode executed in other sequences than the stop sequence. A settable parameter range is narrower in the settings for each cleansing mode executed in the stop sequence than in the settings for each cleansing mode executed in other sequences than the stop sequence. This is because of the following reason: when, e.g., the temperature and flow velocity of cleansing water are, for each cleansing mode in the stop sequence, set to excessive values by erroneous operation or mischief, the stop sequence executed for relaxing ends up with a user's strong feeling of discomfort.

Moreover, as described above, the finishing stop button 72b is disposed for stopping, upon operation during private area cleansing by, e.g., fixed spot cleansing, spraying of cleansing water after execution of the predetermined stop sequence. However, it is configured such that even when the finishing stop button 72b is operated with no cleansing water being sprayed, spraying is stopped after execution of the stop sequence. Thus, the stop sequence is set to include the cleansing modes for cleansing the private area, and in this manner, the finishing stop button 72b can be used as an automatic cleansing operation section for executing a process from cleansing to stoppage by a single operation.

Figure 27:
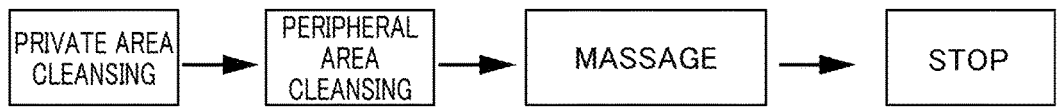
FIG. 27 is a view for describing an example of settings for an automatic cleansing stop sequence for automatically stopping cleansing.

FIG. 27 is an example of settings for an automatic cleansing stop sequence for automatically stopping cleansing as described above.

In the example illustrated in FIG. 27, the fixed spot cleansing mode or the vibration spot cleansing mode is, as the stop sequence for automatically stopping cleansing, first executed for private area cleansing for a predetermined period of time. Subsequently, the wide turning cleansing mode or the wide water screen cleansing mode is executed for cleansing of the periphery of the private area for a predetermined period of time. Eventually, after the massage cleansing mode for the massage with a certain feeling of satisfaction has been executed for a predetermined period of time, spraying of cleansing water is automatically stopped. With such stop sequence settings, spraying of cleansing water is, after defecation, automatically stopped after execution of private area cleansing and the massage only by user's operation of the finishing stop button 72b.

Alternatively, an operation section for automatic stoppage by execution of a series of sequence including private area cleansing can be, as a variation, provided as a "full automatic button" (not shown) in addition to the finishing stop button 72b or instead of the finishing stop button 72b.

According to the sanitary cleansing device 1 of the embodiment of the present invention, the massage cleansing mode (e.g., FIG. 20) is provided, which is for repeating the predetermined massage cleansing cycle including the turning movement pattern (e.g., the left view and the third view from the left in FIG. 20) for turning the water splash point of sprayed cleansing water at the periphery of the private area position of the seated human body and the front-to-back movement pattern (e.g., the second and fourth views from the left in FIG. 20) for moving the water splash point through the private area position in the substantially front-to-back direction of the human body. Thus, the defecation promotion effect can be, with a comfortable feeling, provided also to the user disliking a backflow of cleansing water. That is, since the massage cleansing cycle includes the turning movement pattern for turning the water splash point at the periphery of the private area position, the anal sphincter of the user can be substantially massaged without a backflow of cleansing water, leading to defecation promotion with a comfortable feeling.

Moreover, according to the sanitary cleansing device 1 of the present embodiment, the turning movement pattern includes the clockwise turning movement pattern (e.g., the left view in FIG. 20) and the counterclockwise turning movement pattern (e.g., the third view from the left in FIG. 20). Thus, acclimatization is less caused even when the massage cleansing mode is continuously executed for a long period of time, and a sufficient defecation promotion effect can be provided by a long period of use.

Further, according to the sanitary cleansing device 1 of the present embodiment, the period for performing the turning movement pattern is longer than the period for performing the front-to-back movement pattern (FIG. 21B). Thus, the turning movement pattern with a high degree of demand for defecation promotion can be frequently executed, and therefore, a strong defecation promotion effect can be provided while a feeling of cleansing is provided to the user.

In addition, according to the sanitary cleansing device 1 of the present embodiment, the front-to-back movement pattern included in the massage cleansing cycle is constantly the same movement pattern (the second and fourth views from the left in FIG. 20). Thus, the user becomes acclimated to the front-to-back movement pattern, and therefore, the action of diminishing the massage effect can be reduced to the minimum while a feeling of cleansing is provided to the user.

Moreover, according to the sanitary cleansing device 1 of the present embodiment, the front-to-back movement pattern is a single cycle of straight reciprocation (e.g., the second and fourth views from the left in FIG. 20) for moving the water splash point from the front side to the back side of the human body after movement of the water splash point from the back side to the front side of the human body. Thus, the water screen can be effectively generated in the vicinity of the private area, and a sufficient feeling of cleansing can be provided to the user even with a small amount of cleansing water.

Further, according to the sanitary cleansing device 1 of the present embodiment, the amount of cleansing water sprayed during the turning movement pattern is greater than the amount of cleansing water sprayed during the front-to-back movement pattern. Thus, a great amount of water can be applied for the massage effect, and a high defecation promotion effect can be provided with a small amount of cleansing water.

In addition, according to the sanitary cleansing device 1 of the present embodiment, the massage cleansing cycle (FIG. 21A) includes the vibration spot movement pattern (the center view in FIG. 21A). Thus, both of the massage effect by a direct stimulus to the private area and a feeling of cleansing of the private area can be simultaneously enhanced.

Moreover, according to the sanitary cleansing device 1 of the present embodiment, the vibration spot movement pattern is a movement pattern for reciprocating the water splash point in the front-to-back direction while laterally moving the water splash point in the right-to-left direction (the center view in FIG. 21A). Thus, a high effect of more reducing a backflow as compared to the movement pattern only in the front-to-back direction can be provided, and the massage effect and the cleansing feeling can be enhanced while a backflow can be more greatly reduced.

Further, according to the sanitary cleansing device 1 of the present embodiment, the turning movement pattern, the front-to-back movement pattern, the vibration spot movement pattern, and the turning movement pattern are executed in this order (FIG. 21A). Thus, balance among an anal sphincter massage, a direct stimulus to the private area, and a cleansing feeling to the user is favorable, leading to a high defecation promotion effect and a high feeling of satisfaction.

In addition, according to the sanitary cleansing device 1 of the present embodiment, the flow velocity of cleansing water sprayed during the front-to-back movement pattern is lower than the flow velocity of cleansing water sprayed during the turning movement pattern (FIG. 21B). Thus, a backflow of cleansing water in the front-to-back movement pattern for directly splashing water on the private area position can be further reduced. Moreover, the human body is less sensitive at the periphery of the private area than at the private area. Thus, even when the front-to-back movement pattern is executed at a lower flow velocity after execution of the turning movement pattern, a feeling of discomfort can be less felt by the user.

Moreover, according to the sanitary cleansing device 1 of the present embodiment, a first operation section (the massage button 70b (FIG. 9)) configured to execute the massage cleansing mode and a second operation section (the spot button 66a (FIG. 9)) configured to execute the fixed spot cleansing mode are provided. Thus, the user can clearly distinctively use the fixed spot cleansing mode for mainly cleansing the private area and the massage cleansing mode for mainly promoting defecation. Moreover, the fixed spot cleansing mode can smoothly transit to the massage cleansing mode.

Further, according to the sanitary cleansing device 1 of the present embodiment, the front-to-back movement pattern can be executed as the figure-8-shaped movement pattern (the second and fourth views from the left in FIG. 22). Thus, the interval of interrupting the movement pattern for turning the water splash position at the periphery of the private area position is further shortened, and the massage effect can be more improved.

The preferable embodiment of the present invention has been described above, but various changes can be made to the above-described embodiment. Particularly in the above-described embodiment, the nozzle drive device 12 rotates the nozzle assembly 6 about the rotary shaft 24a (FIG. 5), thereby moving the water splash point in the right-to-left direction of the human body. However, the water splash point can be moved in the right-to-left direction by other mechanisms. For example, a device configured to move the nozzle assembly in parallel in the right-to-left direction is provided as the nozzle drive device so that the water splash point can move in the right-to-left direction. Alternatively, the present invention can be configured such that a mechanism configured to rotate the nozzle assembly about a longitudinal axis thereof is provided to change the angle of the spray port, thereby moving the water splash point in the right-to-left direction.

Moreover, in the above-described embodiment, cleansing water sprayed from the water mass generation device 14 is, as water masses, splashed on the human body in the massage cleansing mode. However, sprayed cleansing water may be discharged in a continuous linear shape without using the water mass generation device 14.

REFERENCE SIGNS LIST

1 sanitary cleansing device of embodiment of the present invention
2 entire water closet body
2*a* bowl portion
2*b* cleansing water tank
4 toilet seat
6 nozzle assembly
6*a* first spray port
6*b* second spray port
7*a* first water supply path
7*b* second water supply path
7*c* third water supply path
7*d* fourth water supply path
8*a* first connection portion
8*b* second connection portion
8*c* third connection portion
8*d* fourth connection portion
9 functional section
10 remote controller (operation device)
10*a* touch panel
12 nozzle drive device
12*a* nozzle front-to-back drive motor
12*b* nozzle right-to-left drive motor
14 water mass generation device
14*a* solenoid valve
16 hot-water heater (heating device)
18 water supply valve (flow velocity changing device)
20 control unit (spray control device)
22 seating sensor
24 base member
24*a* rotary shaft
26 holding cylinder
28*a* drive pulley
28*b* driven pulley
28*c* timing belt
30*a* drive gear
30*b* arc-shaped gear
32 swirl chamber
32*a* tapered flow path
32*b* air suction port
34 swirl chamber
34*a* tapered flow path
36 throat flow path
36*a* tapered portion
38 throat flow path
50 cylinder
50*a* inlet port
50*b* outlet port
52 plunger
54 check valve
56 return spring
58 buffer spring
60 pulsation generation coil
62*a* large-water-quantity cleansing button
62*b* small-water-quantity cleansing button
62*c* dry button
62*d* deodorizing button
64 authentication button
66*a* spot button
66*b* refreshing spot button
66*c* gentle pressure button
68*a* front-to-back button
68*b* wide water screen button
68*c* wide mist button
68*d* wide turning button
70*a* defecation promotion spot button
70*b* massage button
72*a* stop button
72*b* finishing stop button
74*a* set temperature button
74*b* water power button
74*c* water splash position button
74*d* individual setting button
76 display portion
80 cleansing region
80*a* center region
80*b* side region
82 movement pattern
84 movement pattern
86 movement pattern
88 movement pattern
88*a* back end portion
88*b* front end portion
88*c* water screen
90 movement pattern
90*a* back end portion
90*b* back end portion
90*c* water screen
90*d* front end portion
92 granulated water flow
93 water splash area
94 spot cleansing region

What is claimed is:

1. A sanitary cleansing device for spraying cleansing water to an ano-genital region of a human body seated on a toilet seat to cleanse the ano-genital region, comprising:
   a nozzle assembly provided with a spray port through which the cleansing water is sprayed obliquely upward from a back side to a front side of the seated human body;
   a motor configured to drive the nozzle assembly such that a water splash point of the cleansing water sprayed from the spray port moves on the human body in at least two directions including a front-to-back direction and a right-to-left direction;
   an operation device operated by a user to start spraying of the cleansing water from the spray port; and
   a control unit configured to actuate, based on operation of the operation device, the motor to execute a massage cleansing mode,
   wherein the massage cleansing mode is a cleansing mode for repeating a predetermined massage cleansing cycle in which a turning movement pattern and a first movement pattern are alternately repeated,
   wherein in the turning movement pattern, the water splash point of the cleansing water sprayed from the spray port is turned around a periphery of an ano-genital region position of the seated human body,
   wherein the first movement pattern includes a front-to-back movement pattern or a vibration spot movement pattern wherein each repeated first movement pattern is selected from the group consisting of a front-to-back movement pattern, a vibration spot movement pattern, and combinations thereof, wherein in the front-to-back movement pattern, the water splash point is moved through the ano-genital region position in the substantially front-to-back direction of the human body, and wherein in the vibration spot movement pattern, the water splash point is reciprocated in the front-to-back direction of the human body in a stroke shorter than that of the front-to-back movement pattern.

2. The sanitary cleansing device of claim 1, wherein the vibration spot movement pattern is a movement pattern for reciprocating the water splash point in the front-to-back direction of the human body in the stroke shorter than that of the front-to-back movement pattern while laterally moving the water splash point in the right-to-left direction.

3. The sanitary cleansing device of claim 1, wherein in the massage cleansing cycle, the turning movement pattern, the front-to-back movement pattern, the vibration spot movement pattern, and the turning movement pattern are executed in this order.

4. The sanitary cleansing device of claim 1, wherein the turning movement pattern includes a clockwise turning movement pattern and a counterclockwise turning movement pattern.

5. The sanitary cleansing device of claim 4, wherein in the massage cleansing cycle, a period for performing the turning movement pattern is longer than a period for performing the front-to-back movement pattern.

6. The sanitary cleansing device of claim 5, wherein in one cycle of the single massage cleansing cycle, an amount of the cleansing water sprayed during the turning movement pattern is greater than an amount of the cleansing water sprayed during the first movement pattern.

7. The sanitary cleansing device of claim 5, further comprising:

a flow velocity changing device configured to change a flow velocity of the cleansing water sprayed from the spray port, wherein the control unit is programmed to operate the flow velocity changing device such that the flow velocity of the cleansing water sprayed during the first movement pattern is lower than the flow velocity of the cleansing water sprayed during the turning movement pattern.

8. The sanitary cleansing device of claim 5, wherein the operation device includes a first operation section configured to execute the massage cleansing mode, and a second operation section configured to execute a fixed spot cleansing mode in which the spray port is stopped at a position at which the cleansing water is splashed on the ano-genital region position of the human body.

9. The sanitary cleansing device of claim 5, wherein the first movement pattern is a figure-8-shaped movement pattern in which one-direction front-to-back movement through the ano-genital region position, turning movement halfway around the ano-genital region position, one-direction front-to-back movement through the ano-genital region position, and turning movement halfway around the ano-genital region position in a direction opposite to the previous turning movement are executed in this order.

10. The sanitary cleansing device of claim 5, wherein the massage cleansing cycle includes plurality of the front-to-back movement patterns, and each of the front-to-back movement patterns is identical.

11. The sanitary cleansing device of claim 10, wherein the first movement pattern is a single cycle of straight reciprocation in which the water splash point is moved from the back side to the front side of the human body, and then the water splash point is moved from the front side to the back side of the human body.

* * * * *

UNITED STATES PATENT AND TRADEMARK OFFICE
CERTIFICATE OF CORRECTION

PATENT NO. : 10,190,302 B2
APPLICATION NO. : 15/469091
DATED : January 29, 2019
INVENTOR(S) : Hiroshi Hashimoto et al.

Page 1 of 1

It is certified that error appears in the above-identified patent and that said Letters Patent is hereby corrected as shown below:

On the Title Page

(72) Inventors should read: Hiroshi HASHIMOTO, Kitakyushu-shi, Fukuoka, (JP);
Junki HAMADA, Kitakyushu-shi, Fukuoka, (JP);
Keisuke FUJITA, Kitakyushu-shi, Fukuoka, (JP)

Signed and Sealed this
Twenty-first Day of May, 2019

Andrei Iancu
*Director of the United States Patent and Trademark Office*